(12) United States Patent
Conner

(10) Patent No.: US 7,438,423 B2
(45) Date of Patent: Oct. 21, 2008

(54) ILLUMINATION SYSTEM AND PROJECTION SYSTEM INCORPORATING SAME

(75) Inventor: Arlie R. Conner, Portland, OR (US)

(73) Assignee: 3M Innovative Properties Company, St. Paul, MN (US)

( * ) Notice: Subject to any disclaimer, the term of this patent is extended or adjusted under 35 U.S.C. 154(b) by 507 days.

(21) Appl. No.: 11/215,770

(22) Filed: Aug. 29, 2005

(65) Prior Publication Data
US 2007/0046898 A1 Mar. 1, 2007

(51) Int. Cl.
G03B 21/14 (2006.01)
(52) U.S. Cl. .......................... 353/97; 353/38
(58) Field of Classification Search .............. 353/38, 353/97, 102; 349/5, 7, 8
See application file for complete search history.

(56) References Cited

U.S. PATENT DOCUMENTS

| | | | |
|---|---|---|---|
| 4,458,303 A | 7/1984 | Berns | |
| 5,442,414 A | 8/1995 | Janssen et al. | |
| 5,625,738 A | 4/1997 | Magarill | |
| 5,841,579 A | 11/1998 | Bloom et al. | |
| 5,969,876 A | 10/1999 | Kreitzer et al. | |
| 5,978,142 A | 11/1999 | Blackham et al. | |
| 6,301,057 B1 | 10/2001 | Kreitzer | |
| 6,332,688 B1 | 12/2001 | Magarill | |
| 6,417,971 B1 | 7/2002 | Moskovich | |
| 6,547,400 B1 | 4/2003 | Yokoyama | |
| 6,644,814 B2 | 11/2003 | Ogawa et al. | |
| 6,882,331 B2 | 4/2005 | Wu | |
| 6,935,749 B2 * | 8/2005 | Kato | 353/38 |
| 7,052,138 B2 * | 5/2006 | Matsui | 353/31 |
| 2002/0114167 A1 | 8/2002 | Schmidt et al. | |
| 2002/0114573 A1 | 8/2002 | Schmidt et al. | |
| 2002/0118946 A1 | 8/2002 | Wagner | |
| 2002/0196414 A1 * | 12/2002 | Manni et al. | 353/31 |

(Continued)

FOREIGN PATENT DOCUMENTS

EP 0 829 747 A1 3/1998

(Continued)

OTHER PUBLICATIONS

Will Allen and Robert Ulichney, 47.4 Invited Paper: Wobulation: Doubling the Addressed Resolution of Projection Displays, SID 05 Digest, pp. 1514-1517, © 2005 SID.

(Continued)

*Primary Examiner*—William C Dowling
(74) *Attorney, Agent, or Firm*—Robert S. Moshrefzadeh

(57) ABSTRACT

An illumination system and a projection system incorporating same are disclosed. The illumination system includes a two-dimensional array of independently operable light sources. Each light source illuminates substantially the entire active area of a pixelated optical light modulator. Each light source emits light in different emission directions. Each emission direction is directed to a respective location in the active area. Each pixel in the active area is illuminated by an incident cone of light from the two-dimensional array of independently operable light sources. The cone has a cone angle and includes at least one light ray from each light source. The cone angle of at least one such cone of light can be controlled by adjusting the intensity of one or more of the independently operable light sources.

14 Claims, 18 Drawing Sheets

U.S. PATENT DOCUMENTS

| | | |
|---|---|---|
| 2005/0018141 A1 | 1/2005 | Hosaka |
| 2005/0022487 A1 | 2/2005 | Ryan et al. |
| 2006/0187415 A1* | 8/2006 | Slobodin .................... 353/31 |

FOREIGN PATENT DOCUMENTS

| | | |
|---|---|---|
| JP | 2005-189472 | 7/2005 |
| KR | 10-2003-0045433 | 6/2003 |
| KR | 10-2004-0009312 | 1/2004 |
| WO | WO 96/33483 | 10/1996 |
| WO | WO 01/92980 A2 | 12/2001 |
| WO | WO 02/03687 A2 | 1/2002 |
| WO | WO 02/069030 A2 | 9/2002 |
| WO | WO 02/097323 A1 | 12/2002 |
| WO | WO 2003/077013 A3 | 9/2003 |

OTHER PUBLICATIONS

Gerhard Kuhn et al., 58.3: A New LED Light Source For Projection Applications, SID 05 Digest, pp. 1702-1705 © 2005 SID.

O. H. Willemsen et al., 58.4: A Handheld Mini-Projector Using LED Light Sources, SID 05 Digest, pp. 1706-1709, © 2005 SID.

Hans Zou et al., 58.1: Single-Panel LCOS Color Projector with LED Light Sources, SID 05 Digest, pp. 1698-1701, © 2005 SID.

* cited by examiner

ILLUMINATION SYSTEM AND PROJECTION SYSTEM INCORPORATING SAME

FIELD OF THE INVENTION

This invention generally relates to illumination systems. The invention is particularly applicable to illumination systems producing high contrast in projection systems.

BACKGROUND

Illumination systems typically include a light source and illumination optics for transferring light from the light source to a desired destination. Illumination systems are employed in various applications, such as projection displays and backlights for liquid crystal displays (LCD). The light source in an illumination system may, for example, include an arc lamp such as a mercury arc lamp, an incandescent lamp, a fluorescent lamp, a light emitting diode (LED), or a laser.

Projection systems typically include an active light valve for producing an image, an illumination system for illuminating the light valve, and optics for projecting and displaying the image typically on a projection screen. The illumination system in a projection system typically uses one or more white light sources, such as arc lamps. The illumination optics of the illumination system may include means for separating the white light into different colors, such as red, green, and blue.

It is often desirable to illuminate the light valve in such a way so as to display a projected image with high brightness, resolution and contrast.

SUMMARY OF THE INVENTION

Generally, the present invention relates to illumination systems. The present invention also relates to illumination systems employed in projection systems.

In one embodiment of the invention, an illumination system includes a plurality of discrete light sources. The output light intensity of each discrete light source can be individually controlled. The illumination system further includes an aperture stop that is positioned in a conjugate plane of the plurality of discrete light sources. The aperture stop has an opening. Light from the plurality of discrete light sources fills at least a portion of the opening and forms a first optical field at the aperture stop. The illumination system further includes a pixelated light modulator that has an active area capable of displaying a projectable image. The first optical field illuminates the active area and forms a second optical field at the active area. The first and second optical fields form a Fourier transform pair. The contrast ratio of the projectable image can be adjusted by selectively controlling the output intensity of one or more of the discrete light sources.

In another embodiment of the invention, an illumination system includes a two-dimensional array of independently operable light elements. The illumination system further includes a first optical transfer system. The first optical transfer system receives light from the light elements and illuminates an active area of a pixelated light modulator. The active area is capable of displaying a projectable image. Light from at least one light element illuminates the active area from a finite number of directions. Each pixel in the active area is illuminated by each light element. The contrast ratio of the projectable image can be controlled by adjusting the output intensity of one or more of the light elements.

In another embodiment of the invention, an illumination system includes a two-dimensional array of independently operable light sources. Each light source is capable of illuminating substantially the entire active area of a pixelated optical light modulator. Each light source emits light in different emission directions. Each emission direction is directed to a respective location in the active area. Each pixel in the active area is illuminated by an incident cone of light from the two-dimensional array of independently operable light sources. The cone has a cone angle and includes at least one light ray from each light source. The cone angle of at least one such cone of light can be controlled by adjusting the intensity of one or more of the independently operable light sources.

In another embodiment of the invention, an illumination system includes an extended light source that is capable of emitting light with adjustable two-dimensional intensity profile. The illumination system further includes a light modulator that has an active area capable of displaying an image. A point in the extended light source illuminates the entire active area from the same direction. The direction is different for different points in the extended light source. A contrast of the displayed image can be controlled by adjusting the two-dimensional intensity profile of the emitted light.

In another embodiment of the invention, a projection system includes a plurality of discrete light sources that are capable of illuminating the active area of a pixelated light modulator to form a projectable image having a contrast ratio. Each discrete light source illuminates substantially the entire active area. The projection system further includes a processor for controlling the output light intensity of each discrete light source individually. The processor further determines the contrast ratio that corresponds to each discrete light source. The processor further determines the average brightness of the projectable image. When the average brightness is less than a threshold value, the processor reduces the output light intensity of one or more discrete light sources that have low contrast ratios to increase the contrast ratio of the projectable image.

BRIEF DESCRIPTION OF DRAWINGS

The invention may be more completely understood and appreciated in consideration of the following detailed description of various embodiments of the invention in connection with the accompanying drawings, in which.

DETAILED DESCRIPTION

Figure 1:
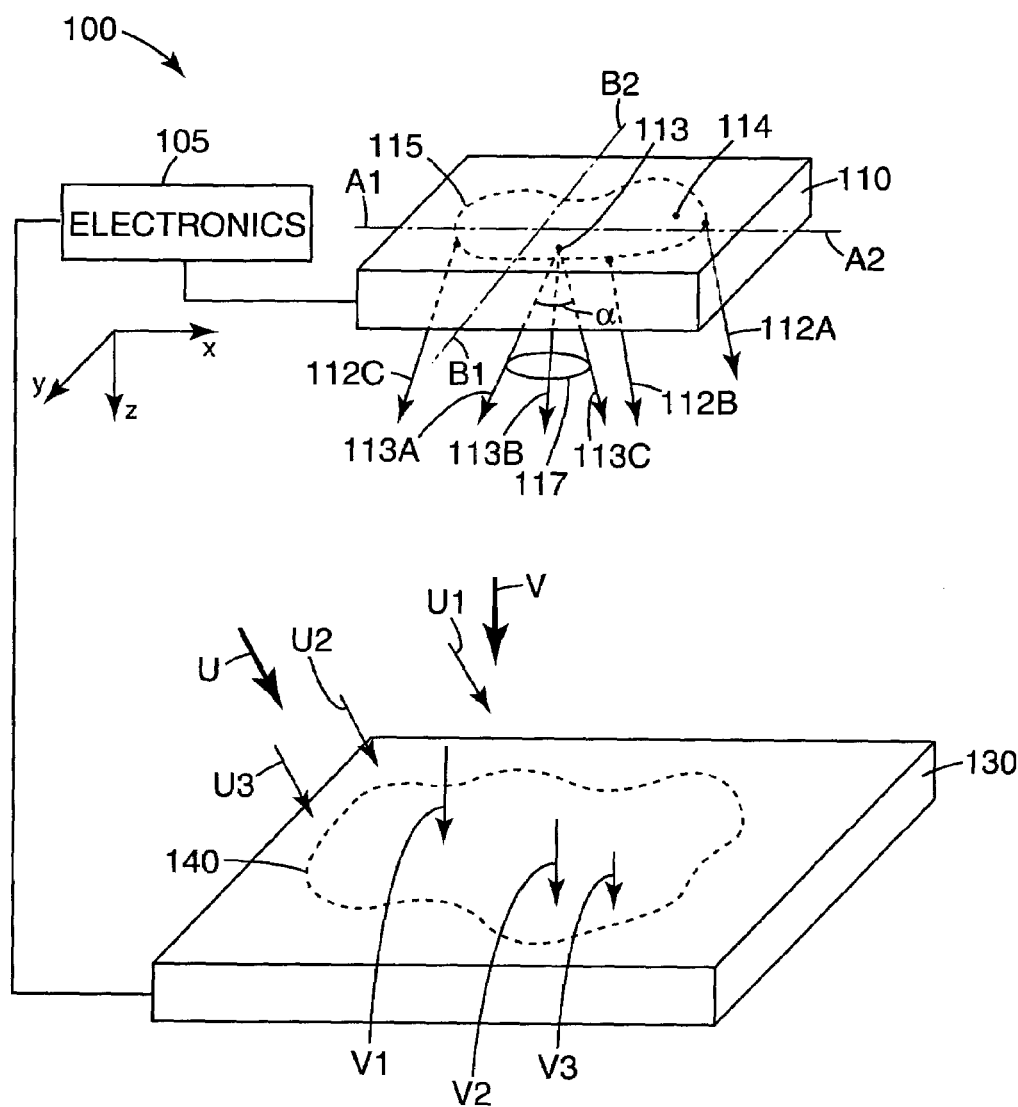
FIG. 1 shows a schematic three-dimensional view of an illumination system in accordance with one embodiment of the invention.

The present invention generally relates to illumination systems. The invention is also applicable to projection systems that include an illumination system where it is desirable to display a projected image with high contrast and brightness. The invention is particularly applicable to projection systems that include a liquid crystal display (LCD) or a digital micromirror device (DMD) for producing a projectable image.

In the specification, a same reference numeral used in multiple figures refers to the same or similar elements having the same or similar properties and functionalities.

An advantage of the invention is that the light intensity profile of the illumination system can be dynamically controlled to optimize the contrast and/or brightness of each or a sequence of projected images depending, for example, on an overall brightness of the projected image. For example, the illumination system can be dynamically controlled to provide maximum brightness for a bright projected image, such as an outdoor day scene, and provide optimum contrast for a relatively dark projected image, such as a night scene.

FIG. 1 illustrates a schematic three-dimensional view of an illumination system 100 in accordance with one embodiment of the invention. Illumination system 100 includes a light assembly 110 and a light modulator 130. Light assembly 110 includes an extended light source 115 that emits light for illuminating light modulator 130.

Figure 2A:
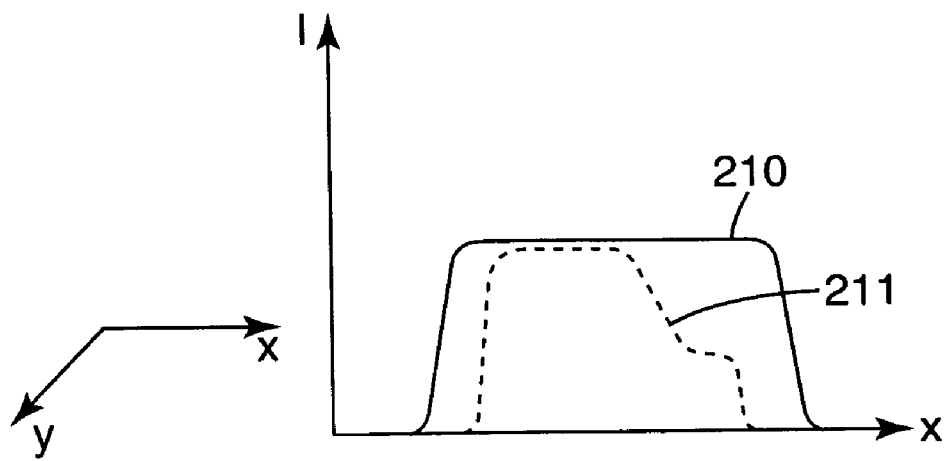
FIGS. 2a and 2b show two exemplary cross-sectional intensity profiles for the extended light source of FIG. 1.
Figure 2B:
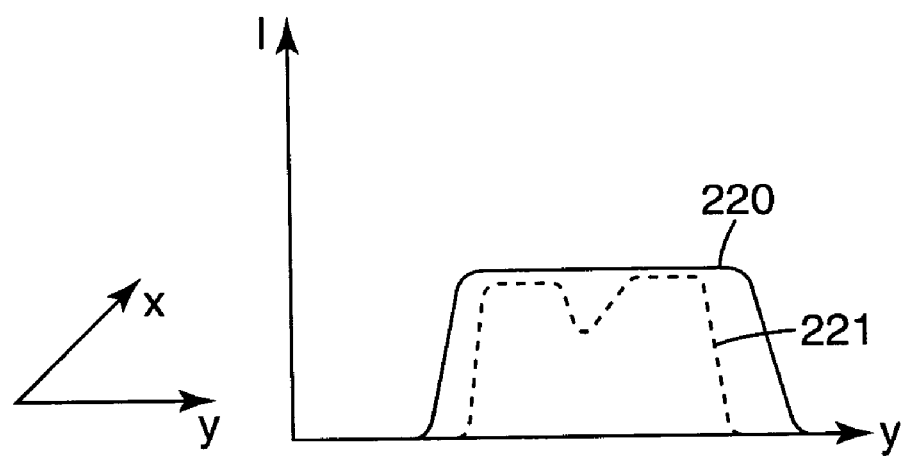

According to one aspect of the invention, extended light source 115 emits light in different emission directions such as directions denoted by rays 112A, 112B, and 112C. The two-dimensional intensity profile of extended light source 115, for example, in the xy-plane, can be controlled by electronics 105 along one or more directions in the xy-plane. For example, the intensity profile can be controlled by electronics 105 along directions A1-A2 and B1-B2, as schematically illustrated in FIGS. 2a and 2b. FIG. 2a shows intensity, I, in the xy-plane as a function of location along the x-direction, and FIG. 2b shows intensity as a function of location along the y-direction. In particular, FIG. 2a illustrates exemplary intensity profiles 210 and 211 along A1-A2 direction, and FIG. 2b illustrates exemplary intensity profiles 220 and 221 along B1-B2 direction. Intensity profiles 210 and 220 can correspond to one configuration of electronics 105, and intensity profiles 211 and 221 can correspond to a different configuration of electronics 105. It will be appreciated that directions A1A2 and B1B2 are merely illustrative directions. In general, according to one aspect of the invention, electronics 105 is capable of energizing extended light source 115 so as to produce a desired two-dimensional intensity profile in the xy-plane.

Referring back to FIG. 1, light modulator 130 has an active area 140 that is capable of displaying an image. According to one aspect of the invention, every light emitting point in extended light source 115 illuminates substantially the entire active area 140. For example, each of light emitting points 113 and 114 in extended light source 115 illuminates substantially the entire active area 140. Furthermore, each individual light emitting point in extended light source 115 illuminates active area 140 from a common direction, where the common direction can be different for different light emitting points. For example, light emitting point 113 in extended light source 115 emits a cone of light 117 having a solid cone angle $\alpha$. Cone 117 includes exemplary light rays 113A, 113B, and 113C. Light cone 117 illuminates active area 140 from a common direction "U." In particular, emitted light ray 113A illuminates active area 140 as light ray U1, emitted light ray 113B illuminates active area 140 as light ray U2, and emitted light ray 113C illuminates active area 140 as light ray U3, where rays U1, U2, and U3 are all along the common direction "U." As another example, light emitting point 114 illuminates active area 140 along direction "V" with exemplary light rays V1, V2, and V3, where direction "V" is different than direction "U."

Illumination system 100 may further include other components not explicitly shown in FIG. 1. For example, illumination system 100 may include an optical module positioned between light assembly 110 and light modulator 130 for transferring light from the light assembly to the modulator. In particular, the optical module may be designed, for example, to redirect light rays in cone 117 so that they illuminate substantially the entire active area 140 along the common direction "U."

Light modulator 130 can be any light modulator that is capable of displaying an image. For example, light modulator 130 may be a Microelectromechanical system (MEMS) such as a digital micro-mirror device (DMD). A DMD typically includes an array of tiltable micro-mirrors. The tilt of each mirror can be independently controlled by, for example, an electrical signal. The tilting of each mirror (or pixel) allows the mirror to act as a fast and precise light switch. As a result, a DMD can act as a spatial light modulator digitally modulating an incident light to, for example, display an image when illuminated with an incident light. An example of a DMD is a Digital Light Processor™ (DLP™) available from Texas Instruments Company, Dallas, Tex.

Further examples of light modulator 130 include a grating light valve (GLV) discussed, for example, in U.S. Pat. No. 5,841,579, or a liquid crystal display (LCD). An LCD type modulator 130 can, for example, be optically transmissive or reflective, such as a high temperature polysilicon (HTPS) LCD or a liquid crystal on silicon (LCoS) display, respectively. In a typical LCD, a thin film of a liquid crystal fills a gap between two substrates made of, for example, glass or plastic. Polarizing sheets are usually placed on one or both sides of the substrates to polarize the light entering and exiting the liquid crystal. The sides of the substrates facing the liquid crystal are typically coated with patterned conductive electrodes that define an array of liquid crystal cells or pixels. Application of an electric field to the electrodes across a cell can affect optical transmission or reflection properties of the cell by changing the orientation of the liquid crystal molecules in the cell. The ability to affect optical properties of individual pixels allows the LCD to display an image when illuminated with an incident light.

In general, light modulator 130 can be any electronically addressable or switchable device capable of forming an image. In some applications, light modulator 130 may display a static image that can, for example, be refreshed, changed, or otherwise updated as a function of time depending on the particular application.

Contrast ratio of a light modulator is usually defined as the ratio of luminance or brightness between "white" (or "on") and "dark" (or "off" or "black") states in an active area of the modulator. There are different methods for measuring contrast ratio, such as sequential and ANSI (American National Standards Institute) contrast. In a sequential contrast ratio measurement, contrast ratio of a modulator, such as modulator 130, is typically determined by measuring the brightness of active area 140, for example, at or near the center of the area, with the entire active area displaying "white" ("on" state), followed by making a similar measurement with the entire active area displaying "black" ("off" or "dark" state). Contrast ratio is the ratio of the two measured values for brightness.

ANSI-contrast is measured by providing a 16 box (pixel) checkerboard display made up of alternating "white" and "black" pixels. The luminance of the "white" state is obtained by measuring and adding the brightness at the centers of the eight "white" pixels. Similarly, the luminance of the "black" state is obtained by measuring and adding the brightness at the centers of the eight "black" pixels. ANSI-contrast is the ratio of the two luminance values.

According to one aspect of the invention, the contrast ratio of an image displayed in active area 140 can be controlled by adjusting the two-dimensional intensity profile of the emitted light. For example, referring again to FIGS. 2a and 2b, an intensity profile characterized by intensity profiles 210 and 220 can result in an image displayed in active area 140 having a contrast ratio that is different than a contrast ratio of the same image being displayed in the active area for an intensity profile characterized by intensity profiles 211 and 221.

One advantage of the present invention is that for a given light modulator and/or light source, the contrast ratio and/or brightness of a displayed image can be improved or optimized by adjusting the two-dimensional intensity profile of extended light source 115.

Illumination system 100 may be advantageously employed in a front or rear projection system to provide improved contrast, resolution, and brightness. An image formed by the projection system may be real or virtual, in which case, a viewer may be able to view the image directly or, for example, with an eyepiece.

Figure 3:
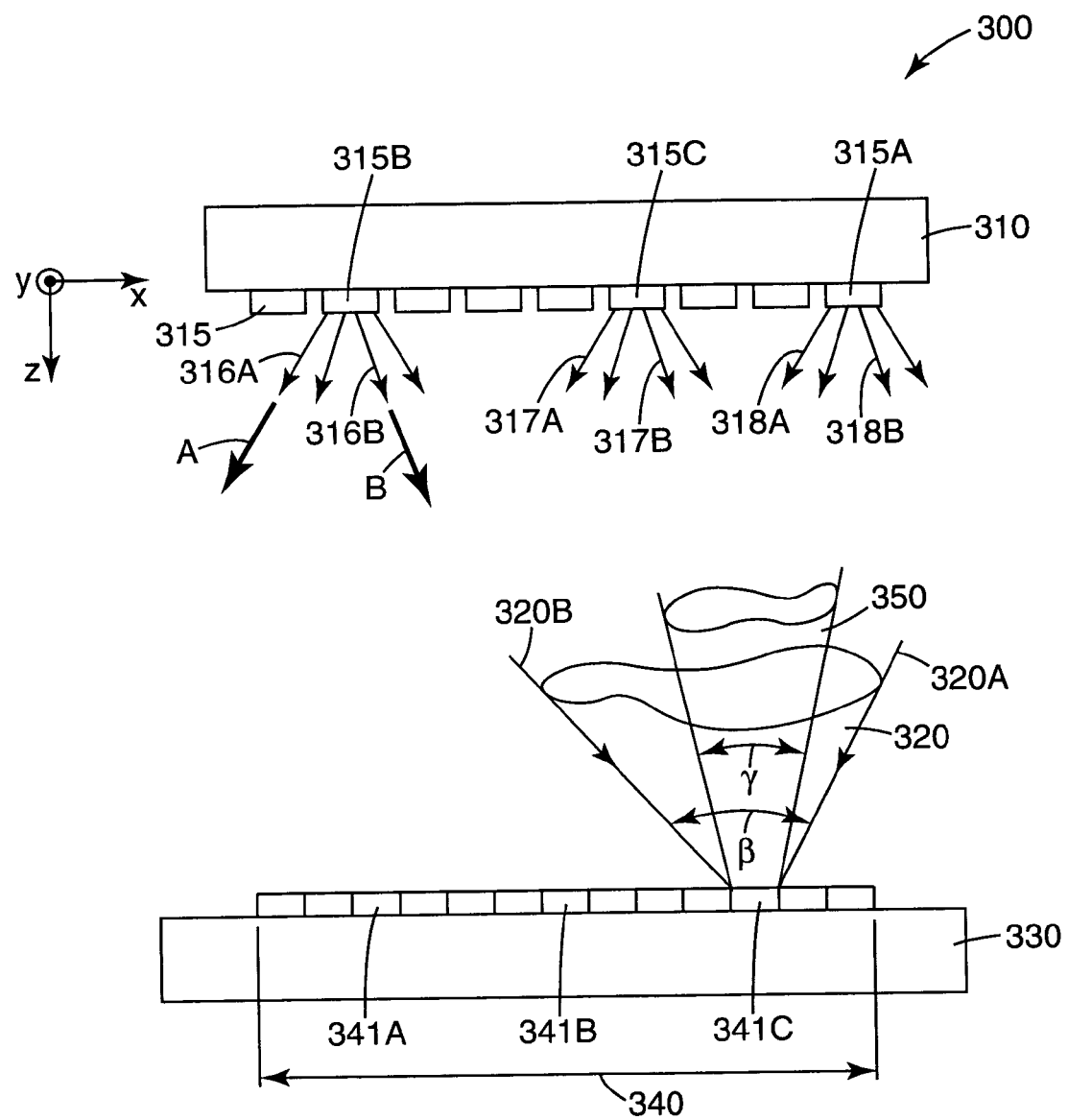
FIG. 3 shows a schematic side-view of an illumination system in accordance with one embodiment of the invention.

FIG. 3 illustrates a schematic side-view of an illumination system 300 in accordance with one embodiment of the invention. Illumination system 300 includes a light assembly 310 and a pixelated light modulator 330 having an active area 340. Light assembly 310 includes a two-dimensional array of independently operable light sources 315, such as light sources 315A, 315B, and 315C. Each light source can be operated individually or independently, meaning, for example, that the output light intensity of each independently operable light source can be adjusted independent from the output light intensity of other independently operable light sources. For example, the output light intensity of light source 315A can be different than the output light intensity of light source 315B, which in turn, can be different than the output light intensity of light source 315C. In some applications or under some circumstances, the output light intensity of one or more of the independently operable light sources can be reduced, or minimized by, for example, turning off or otherwise blocking those particular light sources.

In one embodiment of the invention, each independently operable light source in light source 315 illuminates substantially the entire active area 340. For example, independently operable light source 315C illuminates substantially the entire active area 340. Furthermore, each independently operable light source emits light in different emission directions. For example, light source 315A emits light in different emission directions such as light rays 318A and 318B emitted along emission directions A and B, respectively; light source 315B emits light in different emission directions such as light rays 316A and 316B emitted along emission directions A and B, respectively; and light source 315C emits light in different emission directions such as light rays 317A and 317B emitted along emission directions A and B, respectively. In addition, each emission direction is directed to a respective location in active area 340, meaning that all rays emitted in a given direction by light source 315 illuminate active area 340 in a respective location. For example, rays 316A, 317A, and 318A which are emitted along direction "A" converge to a same location in active area 340, such as pixel 341A. As another example, rays 316B, 317B, and 318B which are emitted along direction "B," where direction "B" is different than direction "A," converge to a different location in active area 340, such as pixel 341B.

Each pixel in the active area 340 is illuminated by an incident light cone that has a cone angle and includes at least one light ray emitted from each independently operable light source in two-dimensional array of light sources 315. For example, pixel 341C in active area 340 is illuminated by light cone 320. Light cone 320 has a cone angle β. FIG. 3 shows two exemplary extreme rays 320A and 320B in light cone 320. Light cone 320 includes a plurality of light rays, where the plurality includes at least one light ray from each independently operable light source in two-dimensional array of light sources 315.

Cone angle β of light cone 320 can be controlled by adjusting the output light intensity of one or more of the independently operable light sources in two-dimensional array of light sources 315. For example, by modifying the output light intensity of one or more of the independently operable light sources 315, light cone 320 can change to light cone 350 with a cone angle γ, where γ is smaller than β.

In general, the contrast ratio of a light modulator decreases as the cone angle of an incident light cone illuminating the modulator increases. In the case of an LCD modulator, this decrease is typically due to the dependence of the liquid crystal material retardance on the incident angle of an incident light ray. Such dependence reduces the contrast ratio by increasing the brightness of a pixel in the dark state. Light leakage in the polarizing sheets (or other components such as polarizing beam splitters) at oblique incident angles can also contribute to contrast degradation.

In the case of a DMD modulator, the decrease in the contrast ratio is believed to be, at least in part, due to optical diffraction effects. In all light modulators, stray or scattered light originating, for example, from an imperfect lens surface can also reduce the contrast ratio.

One advantage of the present invention is that the contrast of an image displayed by light modulator 330 can be increased by adjusting the output light intensities of the individual light sources in two-dimensional array of light sources 315 so that one or more cone angles of incident light cones in active area 340 are reduced which can, for example, result in improved image contrast.

Furthermore, in one embodiment of the invention, the output intensity of one or more light sources that do not significantly affect the size of the cone angle of an incident light cone may be increased to further improve the contrast ratio and/or brightness of an image. Such light sources can, for example, be light sources that contribute incident light rays that are located in the inner parts of an incident light cone.

Illumination system 300 may further include other components not explicitly shown in FIG. 3. For example, illumination system 300 may include an optical component placed between light assembly 310 and pixelated light modulator 330 for transferring light from the light assembly to the modulator. In particular, the optical component may be designed, for example, to redirect all rays emitted along direction "A" to pixel 341A and redirect all rays emitted along direction "B" to pixel 341B.

Illumination system 300 may be advantageously employed in a front or rear projection system to provide improved contrast, resolution, and brightness.

Figure 4A:
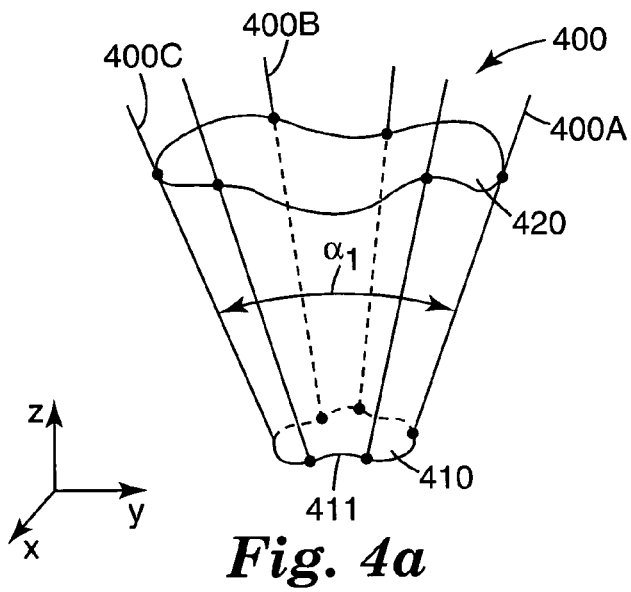
FIGS. 4a-4e show exemplary light cones according to the invention.

In the invention, a cone generally refers to a plurality of light rays defining an inclusion angle, referred to as a cone angle. A general light cone according to the invention is shown in FIG. 4a where cone 400 includes a plurality of light rays such as rays 400A, 400B, and 400C, where the light rays define an inclusion solid angle or cone angle $\alpha_1$. Cone 400 further has a base 410 in the xy-plane defined by an arbitrarily shaped closed curve 411. The base typically refers to a cone cross-section along the z-axis where the light cone intersects a light modulator. In general, a cross-section of cone 400 at other locations along the z-axis may have a shape different than base 410. For example, cross-section 420 of cone 400 in the xy-plane has a different shape than base 410. Base 410 can, for example, illuminate a pixel in active area 340 (see FIG. 3) or a location in active area 140 (see FIG. 1).

Figure 4B:
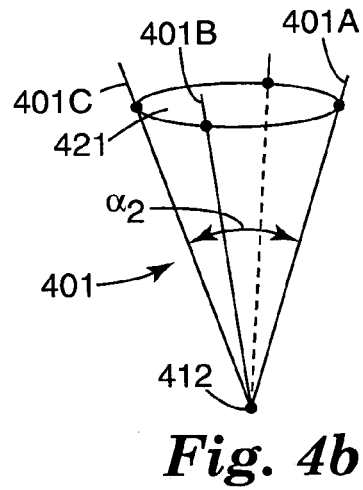

Other exemplary light cones are shown in FIGS. 4b-4e. For example, FIG. 4b shows a cone 401 having an apex 412, a cone angle $\alpha_2$, exemplary outermost light rays 401A, 401B, and 401C, and a cross-sectional profile 421 in the xy-plane where profile 421 can, for example, be a circle or an ellipse or an arbitrary shape. It will be appreciated that a cone according to the invention can be a cone similar to cone 401 but truncated near apex 412.

Figure 4C:
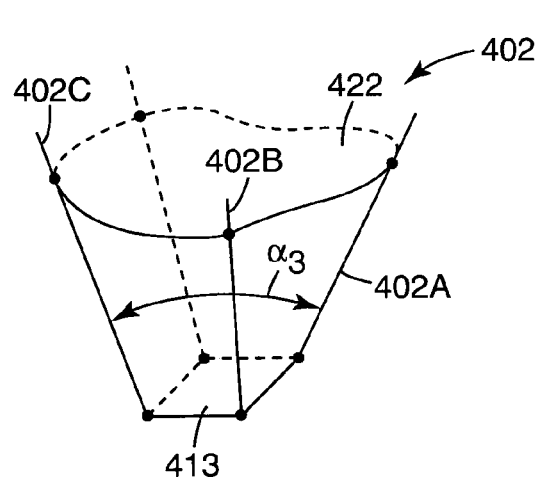
Figure 4D:
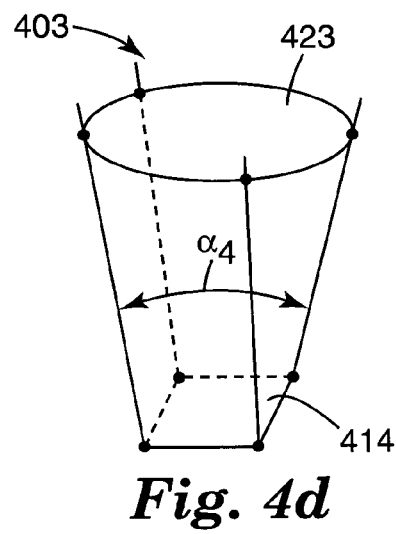

FIG. 4c shows a cone 402 having a rectangular base 413, an inclusion solid angle $\alpha_3$, and exemplary outermost rays 402A, 402B, and 402C. Cross-section 422 is a cross-section of the cone in the xy-plane at a different location along the z-axis. As can be seen, cross-section 422 has an arbitrary profile. Another exemplary cone is schematically shown in FIG. 4d where cone 403 has a rectangular base 414, a cone angle $\alpha_4$, and a cross-section 423 in the xy-plane at a different point along the z-axis that has a circular or elliptical profile. Base 413 or 414 can, for example, illuminate a pixel in active area 340 (see FIG. 3).

Figure 4E:
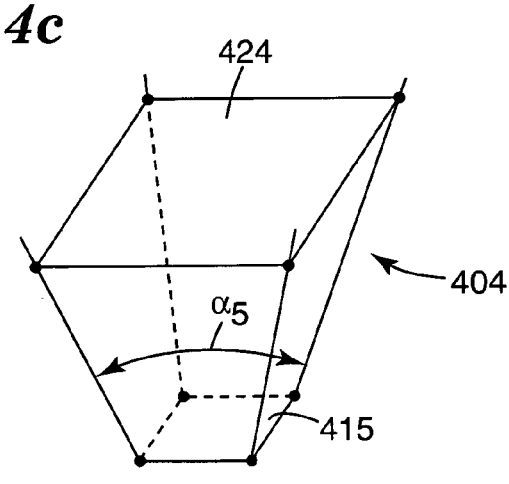

As yet another example, FIG. 4e shows a cone 404 in the shape of a truncated pyramid, or a type of frustum, having a rectangular base 415 and an inclusion angle $\alpha_5$. Cone 404 has rectangular cross-sections along other points along the z-axis, such as cross-section 424. Base 415 can, for example, illuminate a pixel in active area 340 (see FIG. 3).

In general, the base of a cone or other cross-sections of the cone in the xy-plane can have any two-dimensional shape that may be desirable in a particular application. Exemplary shapes include a circle, an ellipse, a polygon such as a quadrilateral, a rhombus, a parallelogram, a trapezoid, a rectangle, a square, or a triangle, or any other shape that may be advantageous in a given application. For example, referring back to FIG. 3, the shape of the base of light cone 320 may be designed to substantially match the shape of pixel 341C, the pixel illuminated by the light cone. Shape matching can increase the contrast and/or brightness of a displayed image.

Figure 5:
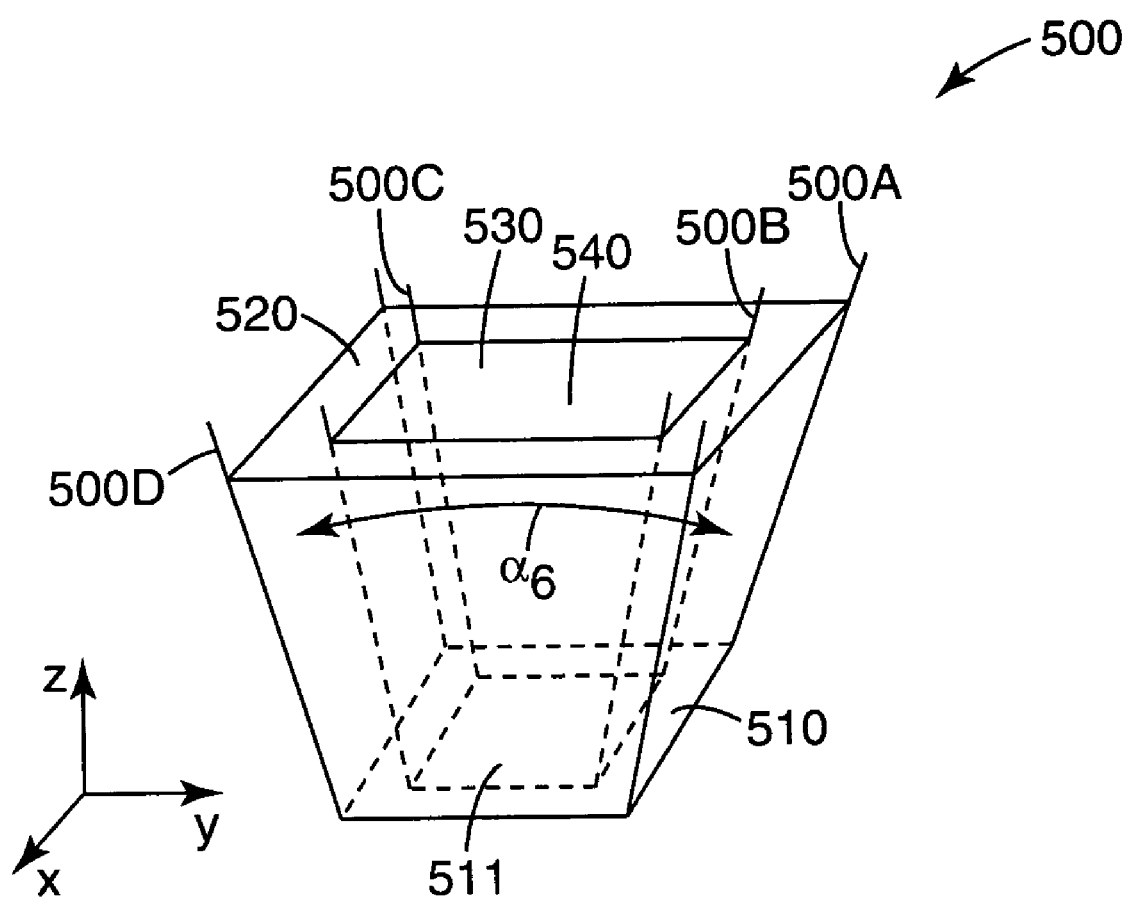
FIG. 5 shows another exemplary light cone according to the invention.

The exemplary cones shown in FIGS. 4a-4e can be solid or can have sections devoid of light rays. One such example is shown in FIG. 5. Cone 500 includes a plurality of light rays such as rays 500A, 500B, 500C, and 500D. The plurality of light rays defines an inclusion solid angle or cone angle $\alpha_6$. Cone 500 further has a rectangular base 510 in the xy-plane with an open area 511. Cross-section 520 is a cross-section of cone 500 in the xy-plane at a point along the z-axis other than the point corresponding to base 510. Cross-section 520 has an open area 530. As shown in FIG. 5, cone 500 has a single open section 540 that includes no light rays. In general, cone 500 can have more than one open section.

Referring back to FIG. 3, array of light sources 315 can include any type of light sources that may be advantageous in an application. Examples include an arc lamp such as a mercury arc lamp, an incandescent lamp, a fluorescent lamp, a laser, a light emitting diode (LED), organic light emitting diodes (OLED), vertical cavity surface emitting lasers (VCSEL), or any other suitable light emitting devices.

In one preferred embodiment of the invention, each light source in two-dimensional array of light sources 315 is an LED.

Figure 6A:
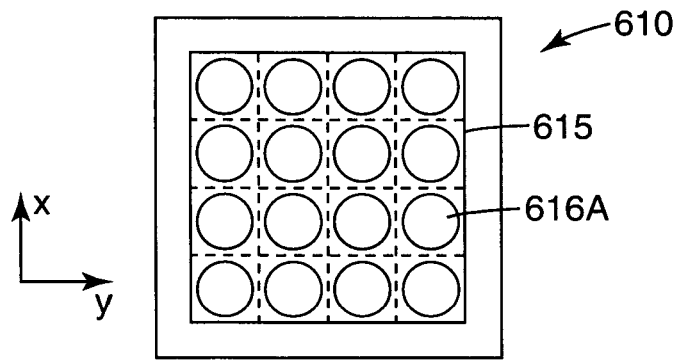
FIGS. 6a-6c show schematic front-view of exemplary light assemblies in accordance with different embodiments of the invention.
Figure 6B:
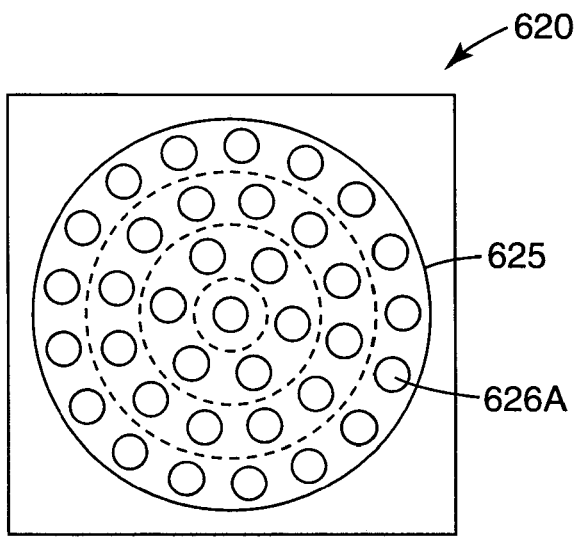
Figure 6C:
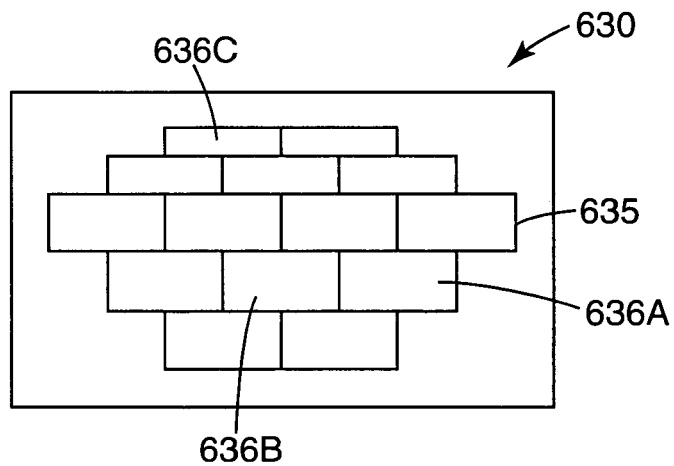

The independently operable light sources in array 315 can be arranged in any form of an array that may be desirable in an application. Examples include rectangular, triangular, hexagonal, circular, or any other suitably configured arrays. FIGS. 6a-6c show schematic front-view of three exemplary light assemblies having different arrays of independently operable light sources. FIG. 6a shows a light source assembly 610 that includes a two-dimensional rectangular array of independently operable light sources 615. Light source 616A is an exemplary independently operable light source in the array of light sources. FIG. 6b shows a light source assembly 620 that includes a two-dimensional circular array of independently operable light sources 625. Light source 626A is an exemplary independently operable light source in the array of light sources. Similarly, FIG. 6c shows a light source assembly 630 that includes a two-dimensional array of independently operable light sources 635. Light source 636A is an exemplary independently operable light source in the array of light sources. It will be appreciated that according to the present invention, the array of independently operable light sources may include different size light sources. For example, in array of light sources 635, light source 636B has a larger area than light source 636C.

In one embodiment of the invention, the individual light sources can be of different types. For example, some of the light sources can be LEDs and some others can be arc lamps, and still some other light sources in the array can be OLEDs. Furthermore, the emission spectra of the light sources can be different. For example, in an array of independently operable LEDs, different LEDs can emit different color light such as white, green, red, and blue.

Figure 7:
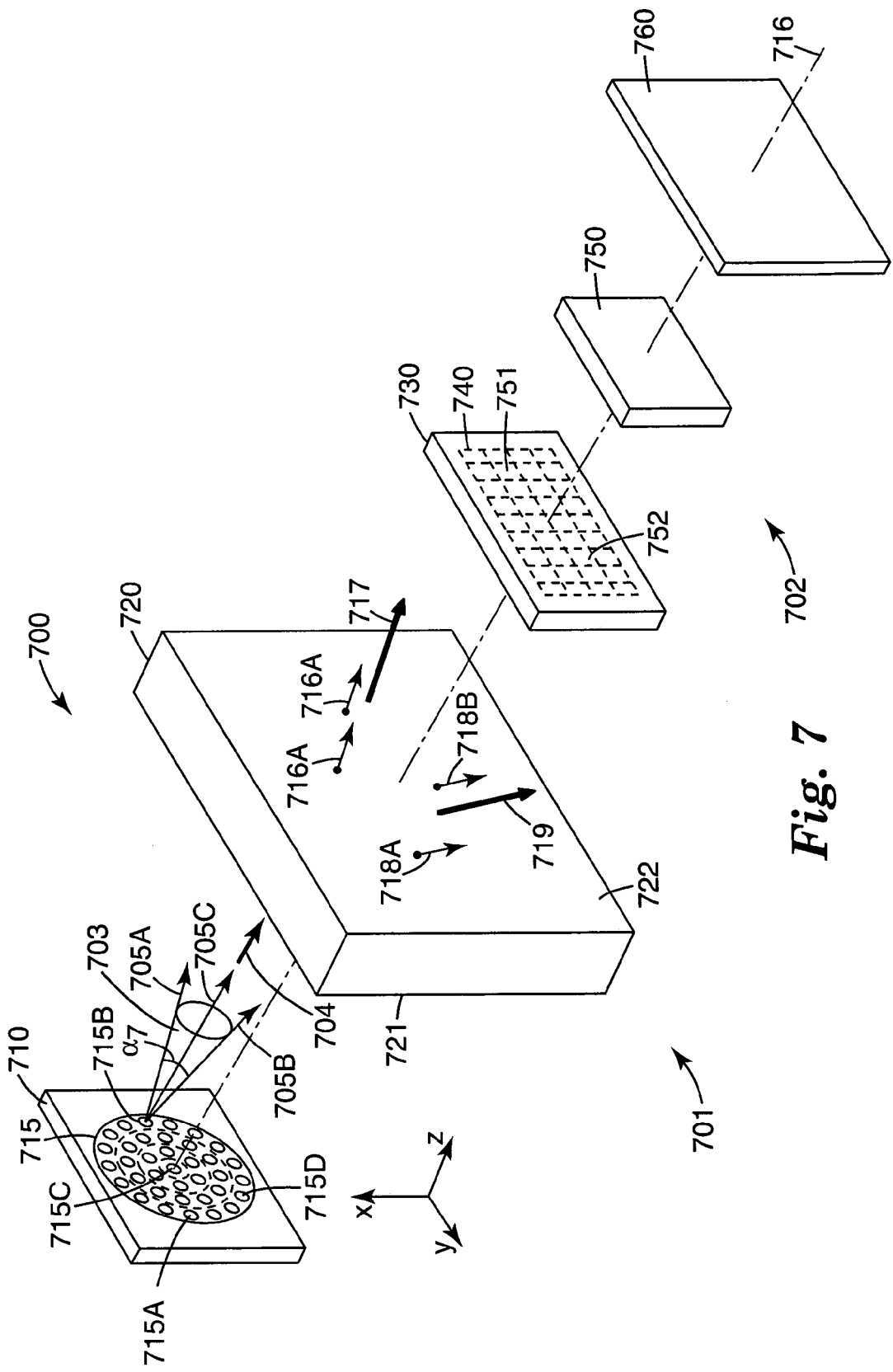
FIG. 7 shows a schematic three-dimensional view of a projection display in accordance with one embodiment of the invention.

FIG. 7 illustrates a schematic three-dimensional view of a projection display 700 in accordance with another embodiment of the invention. Projection display 700 includes an illumination system 701 and a projection system 702. Illumination system 701 includes an extended light source 710, a first optical transfer system 720 and a pixelated light modulator 730.

Extended light source 710 is centered on an optical axis 716 and includes a two-dimensional array 715 of independently operable light elements, such as light elements 715A and 715B. Each light element emits a cone of light characterized by an output light intensity, a cone angle, and a central ray that propagates along a direction. For example, light element 715B emits a cone of light 703 that has a cone angle $\alpha_7$, exemplary outermost rays 705A and 705B, and a central ray 705C that propagates along a direction 704.

First optical transfer system 720 receives light emitted by light source 710 from its input face 721, transfers the received light to its output face 722, and delivers the transmitted light from its output face to pixelated light modulator 730.

According to one embodiment of the invention, light from at least one light element that is transmitted by first optical transfer system 720 illuminates pixelated light modulator 730 from a finite number of directions, where the finite number of directions is at least two. For example, first optical transfer system 720 receives cone of light 703 from its input face 721, transmits the received light to its output face 722 and delivers the transmitted light to modulator 730 along two directions 717 and 719. For example, rays 716A and 716B originate from cone 703, exit output face 722, and propagate towards modulator 730 along direction 717. Similarly, rays 718A and 718B originate from cone 703, exit output face 722, and propagate towards modulator 730 along direction 719.

Figure 8A:
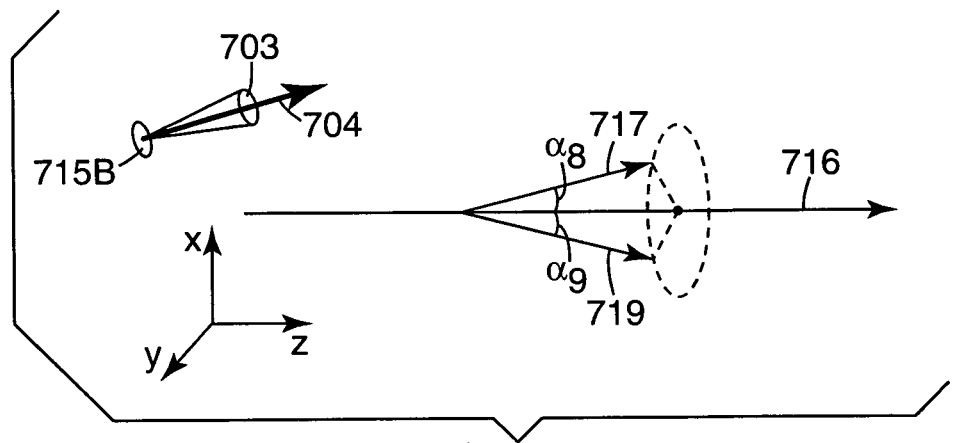
FIGS. 8a and 8b show exemplary illumination directions according to the invention.
Figure 8B:
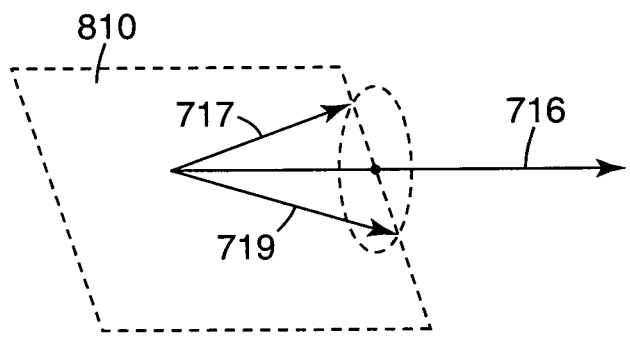

According to one embodiment of the invention, directions 717 and 719 are rotationally symmetric about optical axis 716 as described in reference to the schematics shown in FIGS. 8a and 8b. FIG. 8a shows direction 717 making an angle $\alpha_8$ with optical axis 716 and direction 719 making an angle $\alpha_9$ with optical axis 716, where $\alpha_8$ and $\alpha_9$ are equal. Furthermore, according to one embodiment of the invention, direction 704 is the same as one of directions 717 and 719. For example, in FIG. 8a direction 704 is along direction 717.

As shown in FIG. 8a, directions 717 and 719 and optical axis 716 need not lie in the same plane. According to one embodiment of the invention, however, directions 717 and 719 and optical axis 716 lie in a same plane 810, as shown schematically in FIG. 8b.

Referring back to FIG. 7, optical transfer system 720 redirects cone 703 so that all the cone rays exit the optical transfer system along directions 717 and 719. Light rays in a cone from some light elements may exit first optical transfer system 720 substantially along a single direction. This may be the case, for example, for light elements that are positioned near optical axis 716, such as light element 715C.

Figure 9:
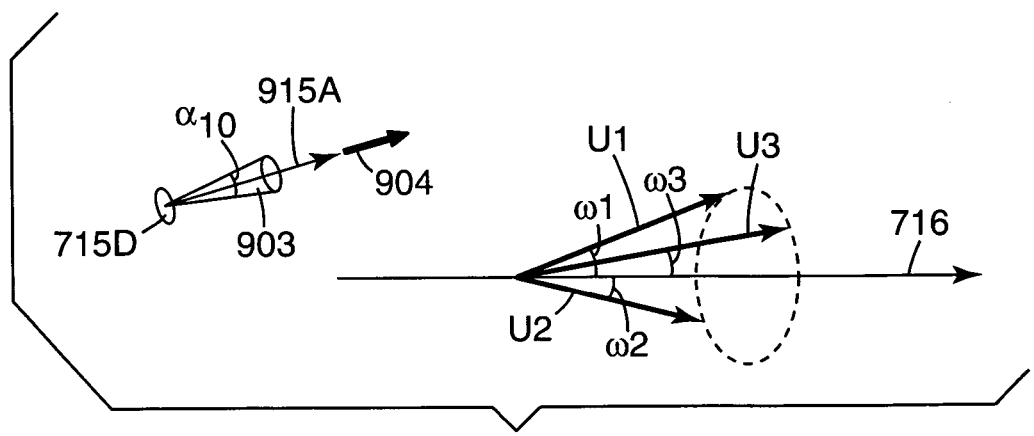
FIG. 9 shows additional exemplary illumination directions according to the invention.

In general, light rays in a light cone, such as light rays in light cone 703 from light element 715B can exit output face 722 of first optical transfer system 720 along a finite number of directions. An example is shown schematically in FIG. 9. In particular, FIG. 9 shows a light element 715D that emits a light cone 903 having a cone angle $\alpha_{10}$ and a central ray 915A that propagates along a direction 904. Light rays in cone 903 exit first optical transfer system 720 along three different directions U1, U2, and U3 that are rotationally symmetric about optical axis 716, meaning that angles $\omega_1$, $\omega_2$, and $\omega_3$ are equal, where $\omega_1$ is the angle between direction U1 and optical axis 716, $\omega_2$ is the angle between direction U2 and optical axis 716, and $\omega_3$ is the angle between direction U3 and optical axis 716. According to one embodiment of the invention, direction 904 is the same as one of three directions U1, U2, and U3.

Referring back to FIG. 7, pixelated light modulator 730 has an active area 740 that includes an array of individually controllable pixels, such as pixels 751 and 752. Active area 740 is capable of displaying an image when illuminated with light delivered by first optical transfer system 720. In general, light modulator 730 can be any electronically addressable or switchable device capable of forming an image, such as an LCD or a DMD. In one embodiment of the invention, each pixel in light modulator 730 provides a higher contrast ratio as the cone angle of an incident cone of light illuminating the pixel is reduced.

First optical transfer system 720 can include one or more optical components such as a lens, a micro lens array, a light homogenizer, an optical filter, a color wheel, a mirror, or any other optical component that may be used in first optical transfer system 720 to transfer light to light modulator 730 according to the invention.

Figure 10:
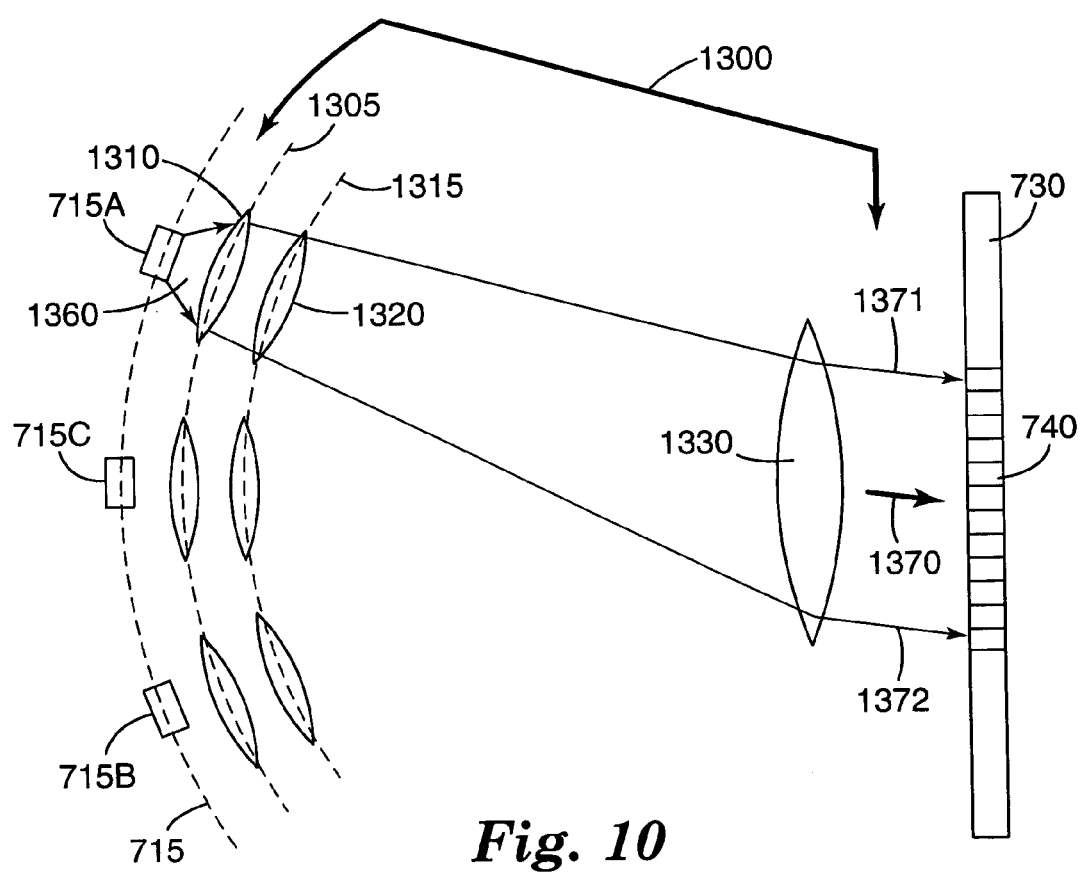
FIG. 10 shows a schematic side-view of an optical transfer system in accordance with one embodiment of the invention.

An exemplary first optical transfer system 720 is optical transfer system 1300 shown schematically in FIG. 10. Optical transfer system 1300 is positioned between two-dimensional array of independently operable light elements 715 and pixelated light modulator 730 having an active area 740. For ease of illustration and without loss of generality, only three light elements 715A, 715B, and 715C of array 715 are shown. Optical transfer system 1300 includes a first lens array 1305, a second lens array 1315, and a field lens 1330. Each light element has a dedicated lens from first lens array 1305 and a dedicated lens from second lens array 1315. For example, light element 715A has dedicated lenses 1310 and 1320. Optical transfer system 1300 redirects light from each light element so that light out put from each light element illuminates substantially the entire active area 740 from a finite number of directions. For example, light element 715-A emits a cone of light 1360. Lenses 1310, 1320, and 1330 act cooperatively to redirect light rays in light cone 1360 to illuminate the entire active area 740 along direction 1370 as exemplified by light rays 1371 and 1372.

Figure 11:
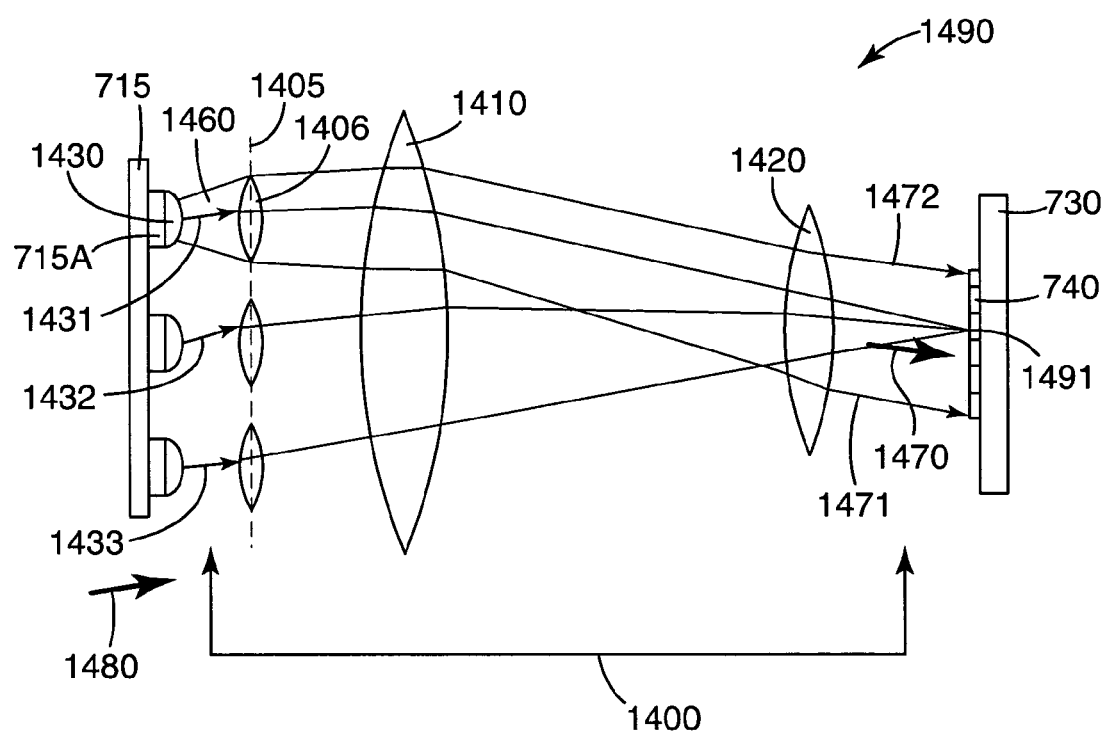
FIG. 11 shows a schematic side-view of an optical transfer system in accordance with another embodiment of the invention.

Another exemplary first optical transfer system 720 is optical transfer system 1400 shown schematically in FIG. 11. Optical transfer system 1400 is positioned between two-dimensional array of independently operable light elements 715 and pixelated light modulator 730 having an active area 740. In the example of FIG. 11, each light element includes a dedicated lens cap for reducing the cone angle of the light cone emitted by the light element. For example, light element 715A includes a lens cap 1430. Optical transfer system 1400 includes a lens array 1405, a condenser lens 1410 and an optional field lens 1420. Each light element has a dedicated lens from lens array 1405. For example, light element 715A has a dedicated lens 1406. Optical transfer system 1400 redirects light from each light element so that light output from each light element illuminates substantially the entire active area 740 from a finite number of directions. For example, light element 715A emits a cone of light 1460. Lenses 1406, 1410, and 1420 act cooperatively to redirect light rays in light cone 1460 to illuminate the entire active area 740 along direction 1470 as exemplified by light rays 1471 and 1472. Optional field lens 1420 can make illumination system 1490 telecentric, meaning that one or both of an entrance pupil and an exit pupil of illumination system 1490 can be located at or near infinity.

Optical transfer system 1400 further directs lights rays emitted by array 715 so that light rays emitted in a same direction are directed to substantially a same location in active area 740. For example, light rays 1431, 1432, and 1433 are emitted by different light elements along a same direction 1480. Optical transfer system 1400 redirects these light rays so that they converge substantially to a same point 1491 in active area 740.

Figure 12:
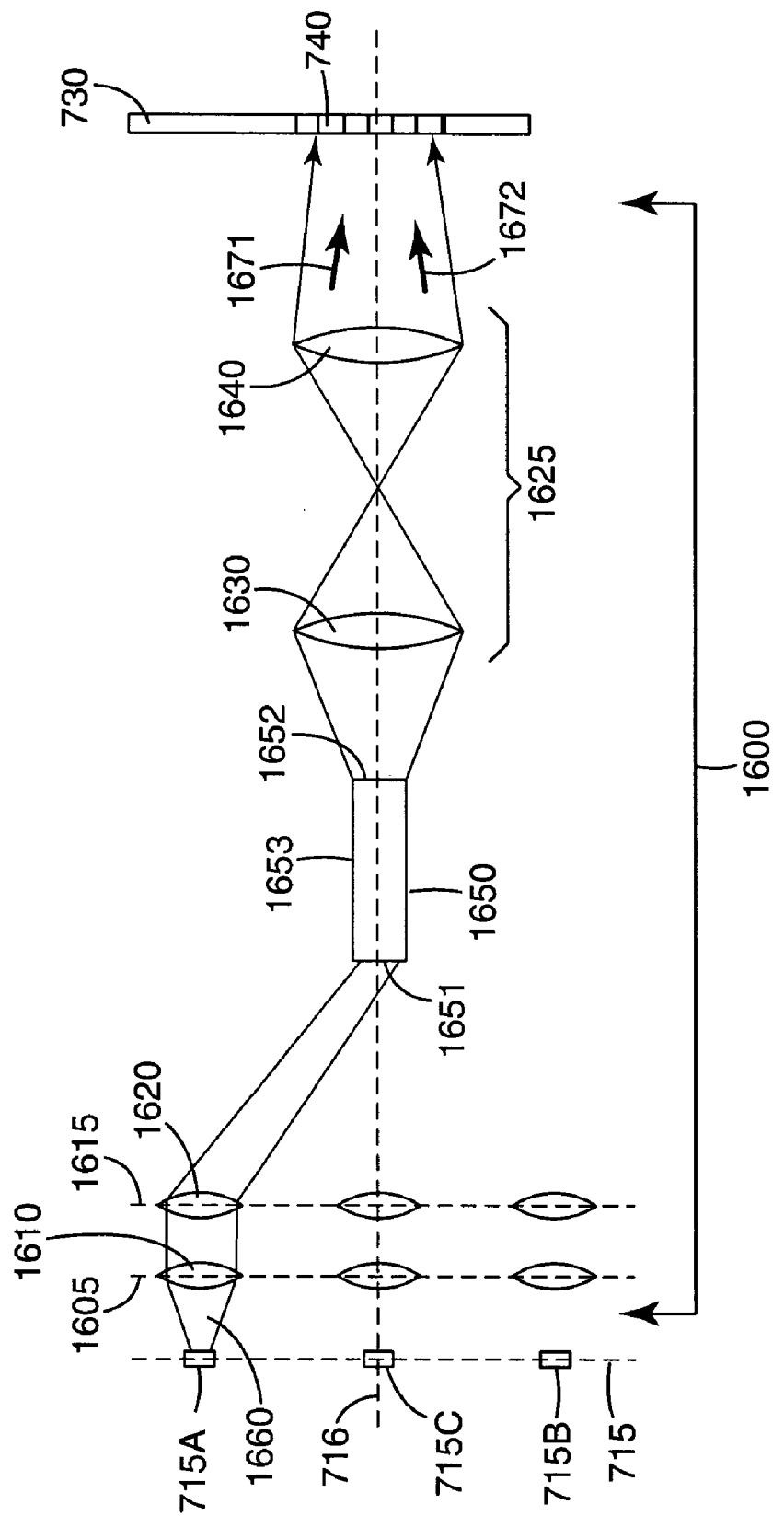
FIG. 12 shows a schematic side-view of an optical transfer system in accordance with another embodiment of the invention.

Another exemplary first optical transfer system 720 is optical transfer system 1600 shown schematically in FIG. 12. Optical transfer system 1600 is positioned between two-dimensional array of independently operable light elements 715 and pixelated light modulator 730 having an active area 740. For simplicity and without loss of generality, only three light elements 715A, 715B, and 715C of array 715 are shown. Optical transfer system 1600 includes a first lens array 1605, a second lens array 1615, a light homogenizer 1650, and a relay lens system 1625 that includes lenses 1630 and 1640. Each light element has a dedicated lens from first lens array 1605 and a dedicated lens from second lens array 1615. For example, light element 715A has dedicated lenses 1610 and 1620. Optical transfer system 1600 redirects light from each light element so that light output from each light element illuminates substantially the entire active area 740 from a finite number of directions. For example, light element 715A emits a cone of light 1660. Optical transfer system 1600 redirects light rays in light cone 1660 to illuminate the entire active area 740 along directions 1671 and 1672, where these two directions can be rotationally symmetric about optical axis 716.

Homogenizer 1650 is designed to homogenize light received from two-dimensional array of independently operable light elements 715. For example, homogenizer 1650 homogenizes light received from light element 715A, where by homogenizing it is meant that light exiting homogenizer 1650 has a more uniform spatial intensity distribution than light entering homogenizer 1650. Examples of known light homogenizers may be found in U.S. Pat. Nos. 5,625,738 and 6,332,688; and U.S. Patent Application Publication Nos. 2002/0114167, 2002/0114573, and 2002/0118946.

Homogenizer 1650 has an input face 1651, an optical rod 1653 and an output face 1652. Input face 1651 may or may not be parallel to output face 1652. In general, output face 1652 may have a shape that is different than the shape of active area 740. For example, output face 1652 may be a trapezoid and active area 740 may be a square. In some applications, output face 1652 and active area 740 may have the same shape, such as a rectangle or a square.

Input face 1651, output face 1652, and a cross-section of optical rod 1653 can have any shape such as a rectangle, a trapezoid, a square, an ellipse or any other shape that may be desirable in an application. Input face 1651, output face 1652, and a cross-section of optical rod 1653 can have different shapes. For example, input face 1651 can be a circle, while output face 1652 can be a square. A cross-section of optical rod 1653 can be different at different locations along the optical rod. For example, optical rod 1653 may be tapered along its length along optical axis 716. The sides of a cross-section of optical rod 1653 may be straight or curved. An example of a tapered optical rod is described in U.S. Pat. No. 6,332,688.

Homogenizer 1650 can have any three-dimensional shape, for example, a polyhedron, such as a hexahedron. A portion of or the entire homogenizer 1650 can be solid or hollow. Homogenizer 1650 may homogenize an input light by any suitable optical method such as reflection, total internal reflection, refraction, scattering, or diffraction, or any combination thereof.

Figure 13:
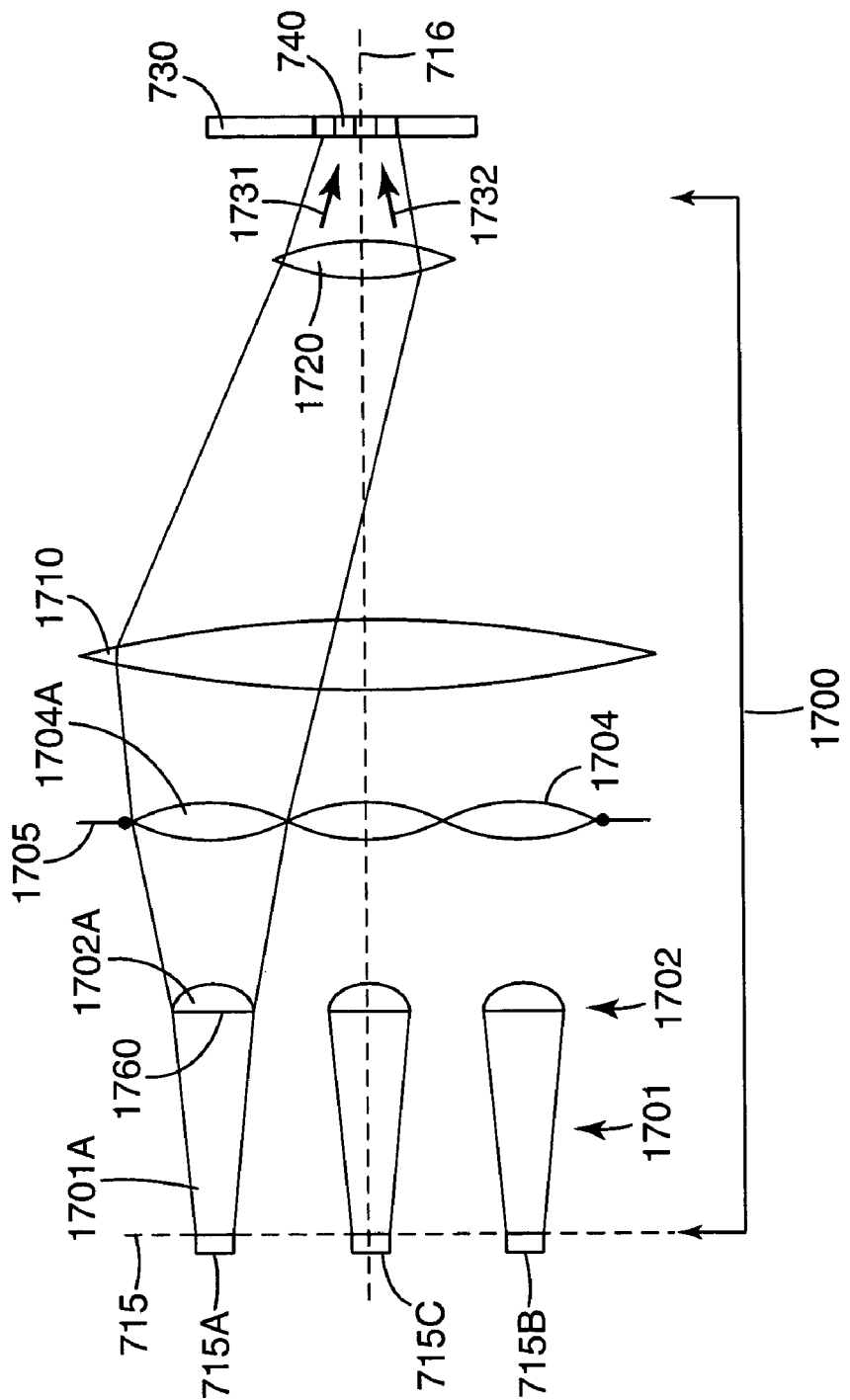
FIG. 13 shows a schematic side-view of an optical transfer system in accordance with yet another embodiment of the invention.

Another exemplary first optical transfer system 720 is optical transfer system 1700 shown schematically in FIG. 13. Optical transfer system 1700 is positioned between two-dimensional array of independently operable light elements 715 and pixelated light modulator 730 having an active area 740. For simplicity and without loss of generality, only three light elements 715A, 715B, and 715C of array 715 are shown. Optical transfer system 1700 includes a plurality of light guides 1701, a plurality of lens caps 1702, a lens array 1704, a condenser lens 1710, and a field lens 1720. Each light element has a dedicated light guide from plurality of light guides 1701, a dedicated lens cap from plurality of lens caps 1702, and a dedicated lens from lens array 1704. For example, light element 715A has dedicated light guide 1701A, lens cap 1702A, and lens 1704A, where in the example of FIG. 13, lens cap 1702A is mounted on the output face 1760 of light guide 1701A. Optical transfer system 1700 redirects light from each light element so that light output from each light element illuminates substantially the entire active area 740 from a finite number of directions. For example, optical transfer system 1700 redirects light rays emitted by light element 715A to illuminate the entire active area 740 along directions 1731 and 1732, where these two directions can be rotationally symmetric about optical axis 716.

Optical transfer system 1700 further includes an aperture stop 1705 positioned at or near lens array 1704. In the embodiment shown in FIG. 13, the output face of each light guide of plurality of light guides 1701 is imaged onto substantially the entire active area 740. For example, output face 1760 is imaged onto substantially the entire active area 740.

Figure 14:
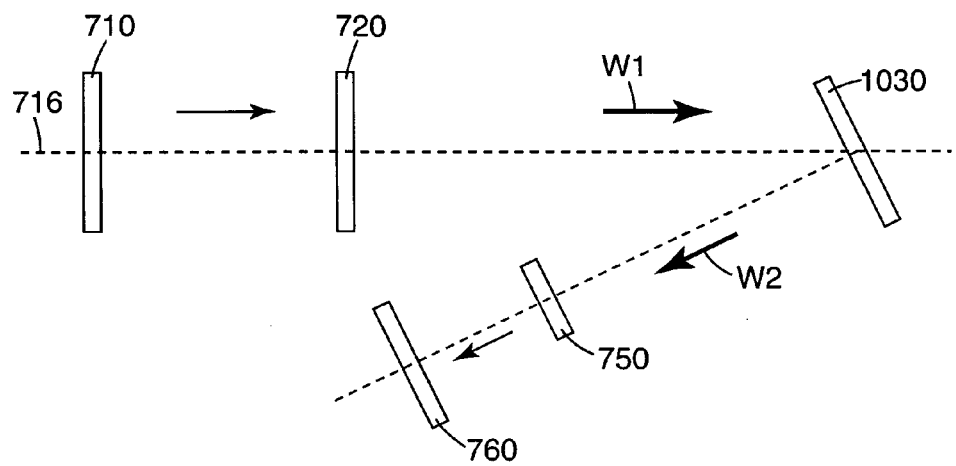
FIG. 14 shows a schematic side-view of a projection display in accordance with one embodiment of the invention.

Referring back to FIG. 7, projection system 702 includes a second optical transfer system 750 and a projection screen 760. Second optical transfer system 750 projects an image formed by light modulator 730 onto projection screen 760. FIG. 7 shows an optically transmissive light modulator 730. In general, light modulator 730 may be transmissive or reflective. A projection display similar to projection display 700, but employing a reflective light modulator, is schematically shown in FIG. 14. In particular, FIG. 14 shows a reflective pixelated light modulator 1030 that receives light in a general direction W1 and selectively reflects the received light in a general direction W2 towards second optical transfer system 750 for projection onto projection screen 760.

Referring back to FIG. 7, projection display 700 may be a rear projection system, in which case, projection screen 760 is a rear projection screen. Projection display 700 may be a front projection system, in which case, projection screen 760 is a front projection screen.

Second optical transfer system 750 can include one or more optical components such as a lens, a micro lens array, a polarizer, a color combiner, a mirror, a Fresnel lens, or any other optical component that may be used in second optical transfer system 750 to project an image displayed by light modulator 730 (or 1030) onto screen 760 according to the invention.

Figure 15:
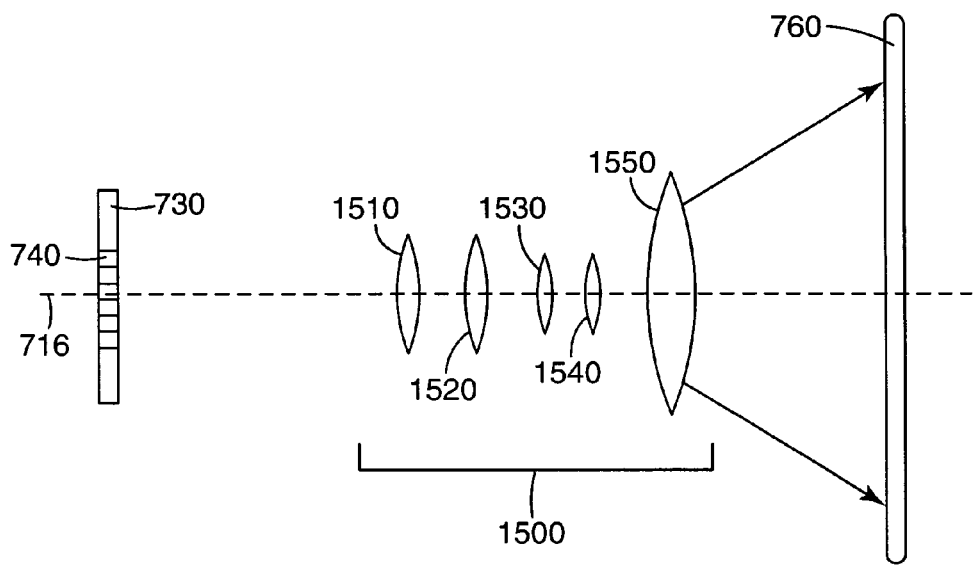
FIG. 15 shows a schematic side-view of an optical transfer system in accordance with one embodiment of the invention.

An exemplary second optical transfer system 750 is optical transfer system 1500 shown schematically in FIG. 15. Optical transfer system 1500 is placed between pixelated light modulator 730 and projection screen 760 and includes a plurality of lens elements, in particular, lens elements 1510, 1520, 1530, 1540, and 1550. Optical transfer system 1500 magnifies and projects an image displayed in active area 740 onto projection screen 760. Other examples of known projection systems are discussed in U.S. Pat. Nos. 6,417,971; 6,301,057; and 5,969,876.

Figure 16:
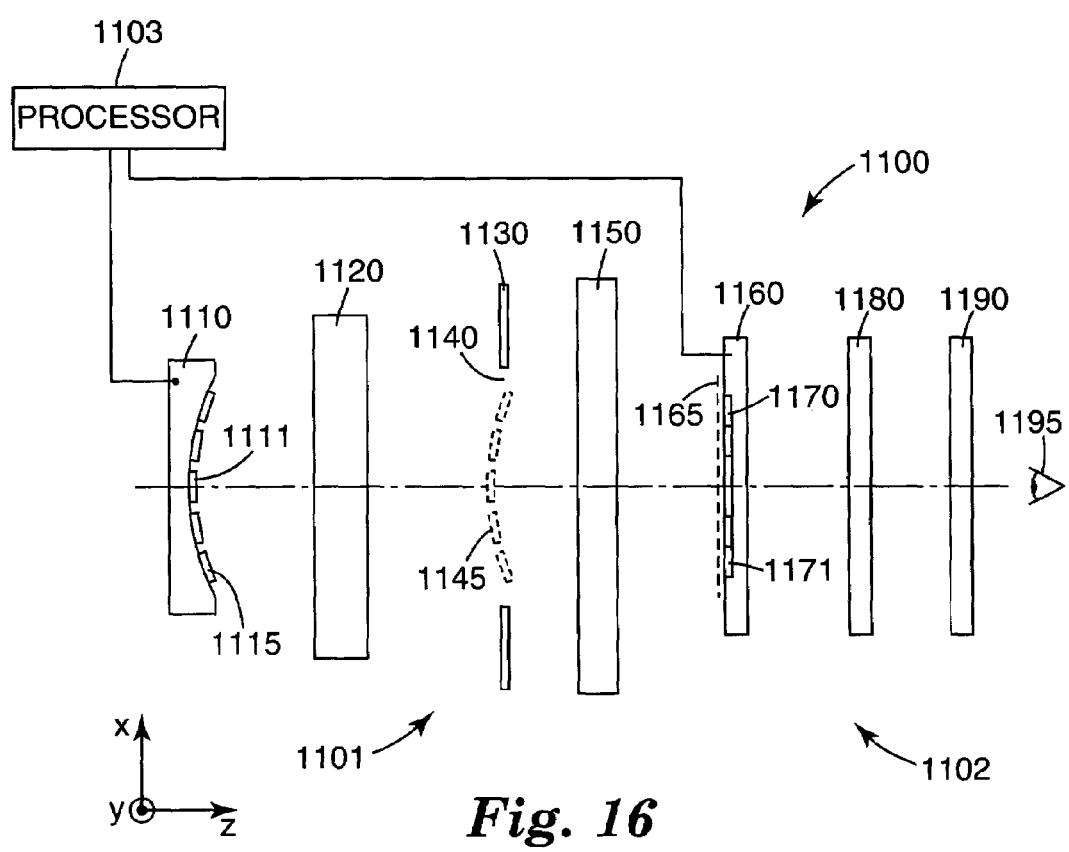
FIG. 16 shows a schematic side-view of a projection display in accordance with one embodiment of the invention.

FIG. 16 shows a schematic side-view of a projection display 1100 in accordance with another embodiment of the invention. Projection display 1100 includes an illumination system 1101 and a projection system 1102. Illumination system 1101 is primarily designed to illuminate an image forming modulator 1160, and projection system 1102 is primarily designed to project an image formed by modulator 1160 onto a projection screen 1190, for example, for viewing by a viewer 1195.

Illumination system 1101 includes an extended light source 1110, a first optical transfer system 1120, an aperture stop 1130, a second optical transfer system 1150 and a pixelated light modulator 1160. Extended light source 1110 includes a plurality of discrete light sources 1115, such as discrete light source 1111. Each of the discrete light sources can be controlled individually, meaning that, for example, the output intensity of each discrete light sources can be controlled independent from other discrete light sources. In some applications, it may be advantageous to control different subsets of plurality of discrete light sources 1115 as discrete groups as described in more detail in reference to FIGS. 17a and 17b.

Figure 17A:
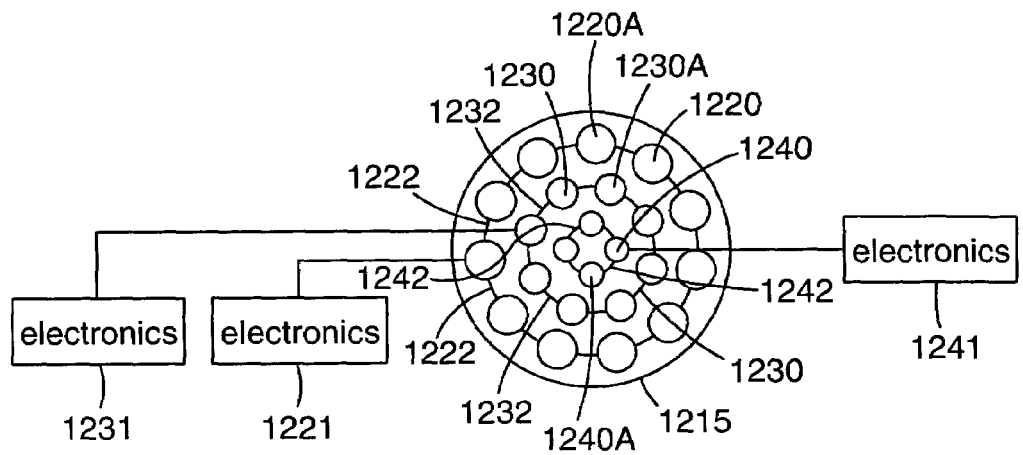
FIGS. 17a and 17b show schematic front-view of exemplary light sources in accordance with different embodiments of the invention.

FIG. 17a shows a front view schematic of a plurality of discrete light sources 1215 similar to light sources 1115 in FIG. 16 in accordance to one embodiment of the invention. Plurality of discrete light sources 1215 includes a first circular row 1220 of discrete light sources, such as discrete light source 1220A, that are connected to each other by electrical connectors 1222. All the discrete light sources in first circular row 1220 can be energized as a group by electronics 1221. Plurality of discrete light sources 1215 further includes a second circular row 1230 of discrete light sources, such as discrete light source 1230A, that are connected to each other by electrical connectors 1232. All the discrete light sources in second circular row 1230 can be energized as a group by electronics 1231. Plurality of discrete light sources 1215 further includes a third circular row 1240 of discrete light sources, such as discrete light source 1240A, that are connected to each other by electrical connectors 1242. All the discrete light sources in third circular row 1240 can be energized as a group by electronics 1241. In general, plurality of discrete light sources 1215 can have more or fewer rows of light sources. In the exemplary two-dimensional light source shown in FIG. 17a, the output intensity of each row can be controlled individually. In general, light source 1215 can include different segments, where the output light intensity of each segment can be controlled individually.

Figure 17B:
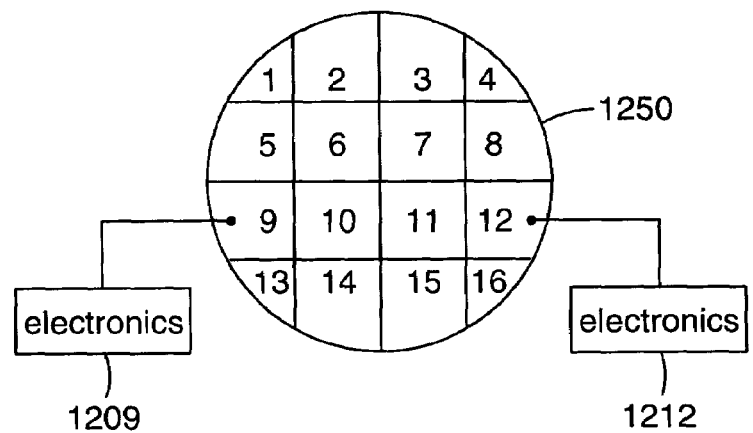

FIG. 17b shows a front view schematic of a plurality of discrete light sources 1250 in accordance to one embodiment of the invention. Plurality of discrete light sources 1250 includes 16 discrete light segments numbered from 1 to 16. Each light segment is individually controlled by, for example, a dedicated electronics circuitry. For example, electronics 1212 controls the output light intensity of light segment 12, and electronics 1209 controls the output light intensity of light segment 9.

Referring back to FIG. 16, plurality of discrete light sources 1115 is shown to be non-planar. In general, plurality of discrete light sources 1115 can be arranged in any configuration that may be advantageous in a given application. For example, plurality of discrete light sources 1115 may be arranged to form a spherical, ellipsoidal, parabolic, hyperbolic, planar, or any other suitable surface. As another example, plurality of discrete light sources 1115 can be arranged to form at least a portion of a polyhedron, such as a tetrahedron, a hexahedron, an octahedron, a dodecahedron, an icosahedron, or any other multifaceted surface. Still as another example, different light sources in plurality of discrete light sources 1115 may be arranged in different ways. For example, the inner light sources may form a portion of a polyhedron, and the outer light sources may form a portion of a spherical surface. The spherical surface may furthermore be positionally offset from the polyhedron so as to form two discrete sets of light sources.

According to one embodiment of the invention, the plurality of discrete light sources 1115 may include different size light sources. For example, referring to FIG. 17b, light source 10 has a larger area than light source 16. The light sources in plurality of discrete light sources 1115 can be of different types. For example, some of the light sources can be LEDs and some others can be arc lamps, and still some other light sources can be OLEDs. Furthermore, the emission spectra of the light sources can be different. For example, in a plurality of discrete LEDs, different LEDs can emit different color light such as white, green, red, or blue.

Aperture stop 1130 has an open area 1140 that is optically transmissive. Opening area 1140 may be in the form of a square, circle, ellipse, trapezoid, or any other shape that may be suitable in an application. Furthermore, the size of opening 1140 can be controlled, for example, manually or electronically.

First optical transfer system 1120 images plurality of discrete light sources 1115 in a plane that substantially coincides with or is substantially close to the plane of aperture 1130. The formed image is a first optical field 1145 that fills at least a portion of aperture opening 1140. In one embodiment of the invention, first optical field 1145 substantially fills the entire aperture opening 1140. Optical field 1145 and plurality of discrete light sources 1115 form a conjugate pair, meaning that, for example, optical field 1145 lies in an image plane of plurality of discrete light sources 1115.

One advantage of the present invention is dynamic apodization, meaning that by individual control of discrete light sources in plurality of discrete light sources 1115, the effective shape and/or size of aperture stop 1130 can be dynamically controlled resulting in improved brightness and/or contrast of a projected image.

First optical transfer system 1120 can include one or more optical components such as a lens, a micro lens array, a light homogenizer, an optical filter, a color wheel, a mirror, a Fresnel lens, or any other optical component that may be suitably used in first optical transfer system 1120 to image plurality of discrete light sources 1115 onto aperture opening 1140.

Pixelated light modulator 1160 has a pixelated active area 1170, including pixels such as pixel 1171, that is capable of forming an image. Second optical transfer system 1150 transfers first optical field 1145 onto active area 1170, thus forming a second optical field 1165 in the plane of active area 1170 or pixelated light modulator 1160. According to one embodiment of the invention, first optical field 1145 and second optical field 1165 form a Fourier transform pair, meaning that, in general, every point in optical field 1145 illuminates substantially the entire active area 1171 from a finite number of directions, preferably one or two directions. Furthermore, all light rays from first optical field 1145 that propagate along a same direction converge substantially at a respective point in active area 1170.

Second optical field 1165 may illuminate a portion of active area 1170, a situation that is sometimes referred to as an underfill. Second optical field 1165 may illuminate an area extending beyond active area 1170, a situation that is sometimes referred to as an overfill. According to one embodiment of the invention, the size of second optical field 1165 is substantially the same as the size of active area 1170, meaning that there is minimized or no overfill or underfill.

Second optical transfer system 1150 can include one or more optical components such as a lens, a micro lens array, a light homogenizer, an optical filter, a color wheel, a mirror, a Fresnel lens, or any other optical component that may be suitably used in second optical transfer system 1150 to receive first optical field 1145 and form a second optical field 1165 at modulator 1160 where the two optical fields form a Fourier transform pair.

Figure 18:
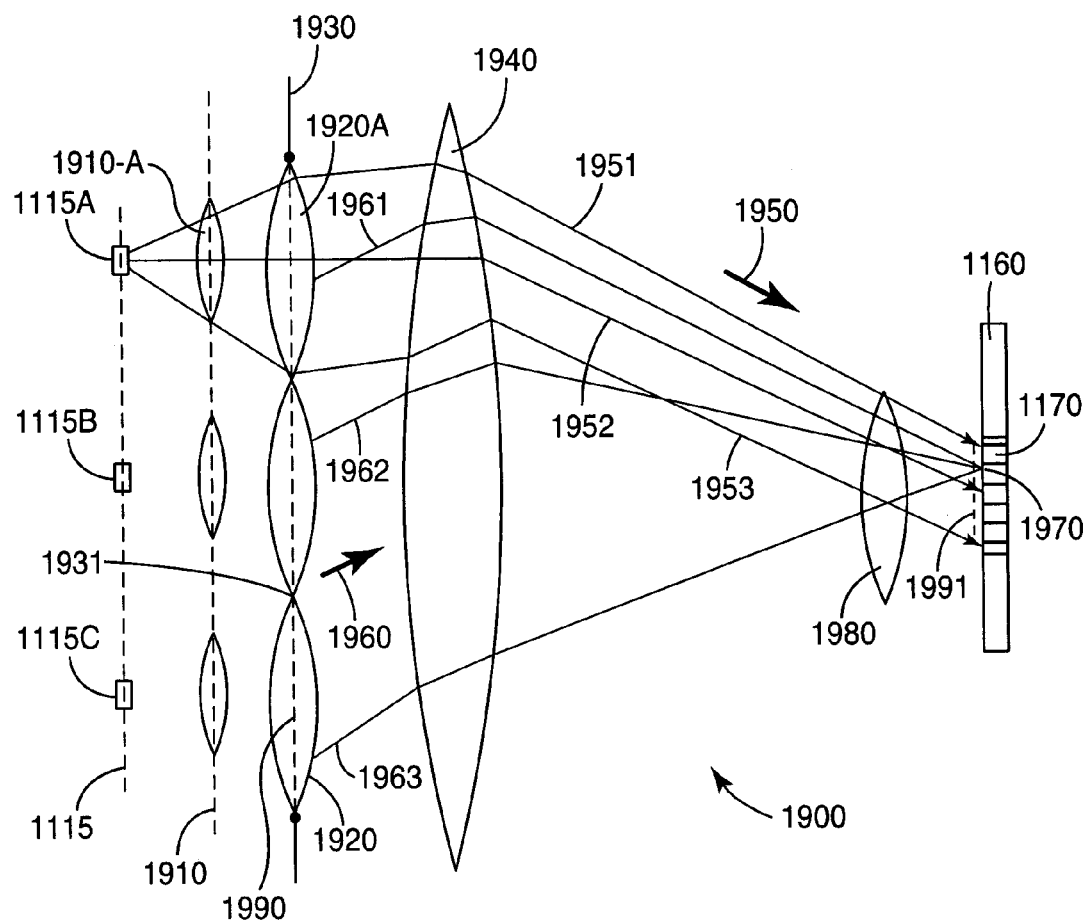
FIG. 18 shows a schematic side-view of an illumination system in accordance with one embodiment of the invention.

An exemplary first optical transfer system 1120 and second optical transfer system 1150 is shown in FIG. 18. FIG. 18 shows a schematic side-view of an illumination system 1900 in accordance with one embodiment of the invention. Illumination system 1900 includes a plurality of discrete light sources 1115. For simplicity and without loss of generality, plurality of discrete light sources 1115 includes three light sources 1115A, 1115B, and 1115C. In general, plurality of discrete light sources 1115 can include an array of discrete light sources arranged as required by the application. Illumination system 1900 further includes a pixelated light modulator 1160 having an active area 1170. Illumination system 1900 further includes a first plurality of discrete lenses 1910, a second plurality of discrete lenses 1920, an aperture stop 1930, a condenser lens 1940, and a field lens 1980. Each discrete light source has a dedicated lens from first plurality of discrete lenses 1910 and a dedicated lens from second plurality of discrete lenses 1920. For example, light source 1115A has dedicated lenses 1910A and 1920A. Second plurality of discrete lenses 1920 are positioned in opening 1931 of aperture stop 1930. According to the exemplary embodiment shown in FIG. 18, aperture stop 1930 is positioned in a conjugate plane of plurality of light sources 1115. For example, light source 1115A is imaged in opening 1931 of aperture stop 1930. Light from plurality of light sources 1115 forms a first optical field 1990 in opening 1931. According to one embodiment of the invention, light from each discrete light source illuminates substantially the entire active area 1170 in a same direction. For example, light emitted by discrete light source 1115A illuminates substantially the entire active area 1170 in a direction 1950 as exemplified by light rays 1951, 1952, and 1953. Furthermore, according to one embodiment of the invention, light rays that exit opening 1931 of aperture 1930 in a given direction are directed to a same location in active area 1170. For example, light rays 1961, 1962, and 1963 exit opening 1931 of aperture stop 1930 along direction 1960. These rays subsequently converge at a same location 1970 in active area 1170. According to one embodiment of the invention, first optical field 1990 illuminates substantially the entire active area 1170 and forms a second optical field 1991 at the active area, where the two optical fields form a Fourier transform pair.

Referring back to FIG. 16, projection system 1102 includes a third optical transfer system 1180 and a projection screen 1190. Third optical transfer system 1180 projects an image formed by light modulator 1160 onto projection screen 1190. FIG. 16 shows an optically transmissive light modulator 1160. In general, as discussed previously, light modulator 1160 may be optically transmissive or reflective.

Projection display 1100 may be a rear projection system, in which case, projection screen 1190 is a rear projection screen. Projection display 1100 may be a front projection system, in which case, projection screen 1190 is a front projection screen.

Third optical transfer system 1180 can include one or more optical components such as a lens, a micro lens array, a polarizer, a color combiner, a mirror, a Fresnel lens, an aperture stop, or any other optical component that may be suitably used in third optical transfer system 1180 to project an image displayed by light modulator 1160 onto screen 1190. An example of third optical transfer system 1180 is shown in FIG. 15.

Projection display 1100 further includes a processor 1103 for measuring and storing the contrast ratio corresponding to each discrete light source. This can be done by, for example, turning off all but one of the discrete light sources, and measuring the contrast ratio in active area 1170 corresponding to "on" light source. Such a measurement can be made for each light source resulting in an electronically stored look-up table ranking the discrete light sources from having the worst or smallest contrast ratio to the best or highest contrast ratio.

Processor 1103 can also measure an average brightness of a projectable image formed in active area 1170 where the projectable image can, for example, be projected onto projection 1190 by third optical transfer system 1180. The measured average brightness can be used by processor 1103 to increase the contrast ratio and/or brightness of the projectable image by adjusting the output intensity of one or more discrete light sources. For example, when the average brightness is lower than a threshold value signaling a relatively dark image such as a night scene, processor 1103 may reduce the output intensity of or completely turn off one or more of the independent light sources that have the lowest corresponding contrast ratios. The affected discrete light sources can be in the outer part of the plurality of discrete light sources 1115, in the inner part, or in general positioned at different locations in the extended light source 1110. An advantage of the invention is that the output intensity of a discrete light source can be controlled individually to improve the contrast ratio and/or brightness of a projectable image regardless of the location of the discrete light source. At the same time, processor 1103 can increase the output intensity of one or more discrete light sources that have corresponding high contrast ratios. Therefore, the brightness and contrast of a relatively dark projectable image may be increased.

If the average brightness of a projectable image in active area 1170 is higher than a threshold value signaling a bright image such as an outdoor day image, processor 1103 may keep all discrete light sources 1115 on, and may even increase the output intensities of one or more of the discrete light sources.

An advantage of the present invention is that processor 1103 can measure a contrast ratio for each discrete light source for any given active area 1170 and any given plurality of light sources 1115. For example, the output intensity of a particular discrete light source that has a corresponding low contrast ratio can be reduced regardless of where the discrete light source is located in extended light source 1110. Processor 1103 can be part of electronics 105 (see FIG. 1), in which case, the functions of processor 1103 can be carried out by electronics 105.

Figure 19:
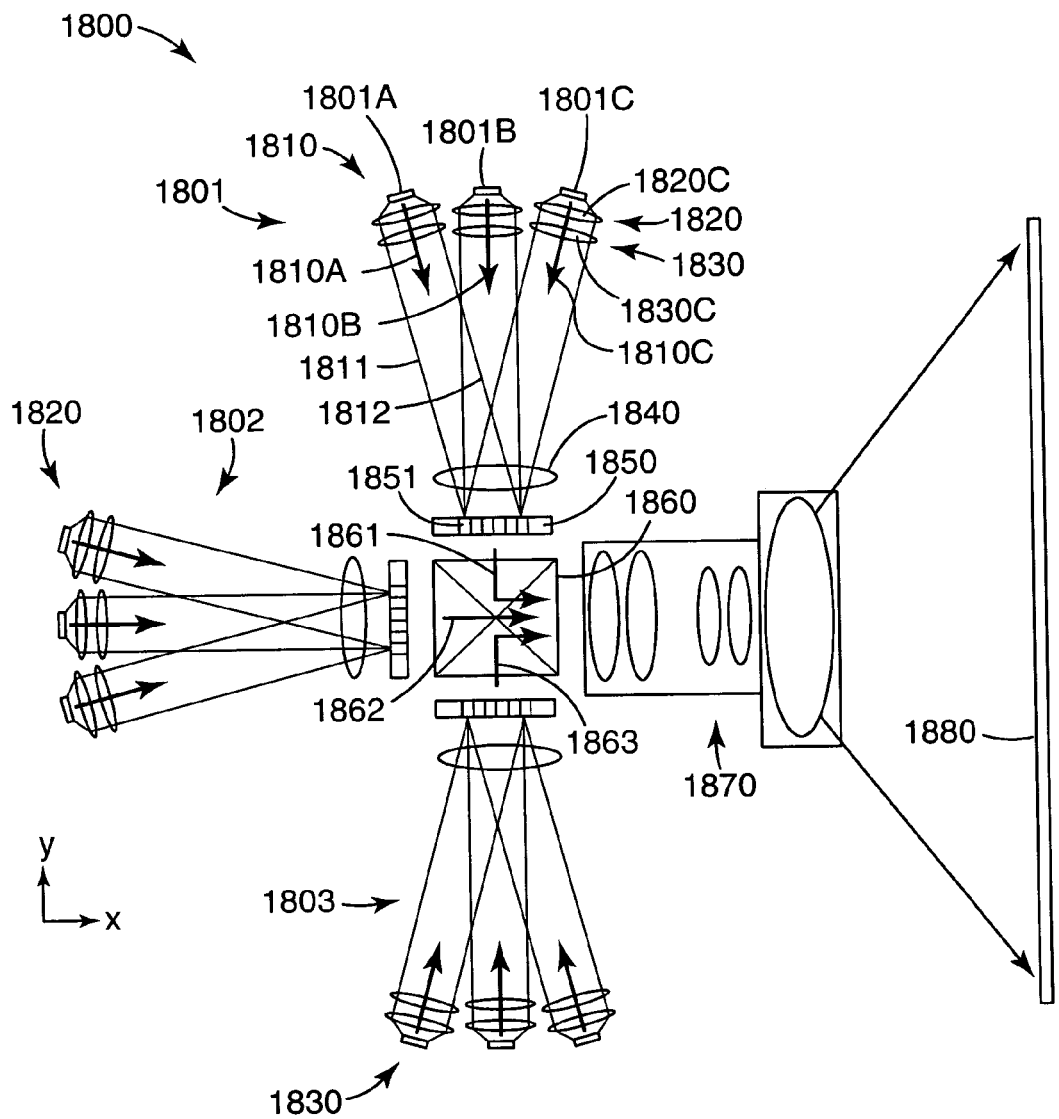
FIG. 19 shows a schematic side-view of a projection system in accordance with one embodiment of the invention.

FIG. 19 shows a side-view of a projection system 1800 in accordance with one embodiment of the invention. Projection system 1800 includes a first illumination system 1801, a second illumination system 1802, and a third illumination system 1803, although, in general projection system 1800 can have more or fewer illumination systems. Furthermore, although FIG. 19 shows the three illumination systems generally arranged along x and y directions, in general, each illumination system can be oriented in any direction as required in a given application.

Each illumination system in FIG. 19 includes a two-dimensional array of independently operable light elements, a first lens array, a second lens array, a field lens, and a light modulator having an active area that is capable of displaying an image. For example, first illumination system 1801 includes a first two-dimensional array of independently operable light elements 1810, three of which (light elements 1801A, 1801B, and 1801C) are shown in FIG. 19. In general, each two-dimensional array of independently operable light elements includes a plurality of light sources arranged so as to optimally meet the needs in a given application. Illumination system 1801 further includes a first lens array 1820 and a second lens array 1830. Each light element in array 1810 has a dedicated lens from first lens array 1820 and a dedicated lens from second lens array 1830. For example, light element 1801C has dedicated lenses 1820-C and 1830-C. Illumination system 1801 further includes field lens 1840, and a light modulator 1850 that has an active area 1851, where the active area is capable of displaying an image. Light modulator 1850 can be an LCD or any other light modulator capable of forming an image, examples of which have been previously discussed in the specification.

According to one embodiment of the invention, light emitted by each light element illuminates substantially the entire active area of a corresponding light modulator. For example, all light emitted from light element 1801A illuminates substantially the entire active area 1851. Furthermore, according to one embodiment of the invention, the illumination is along a same direction. For example, light emitted from light element 1801A illuminates active area 1851 along direction 1810A as exemplified by light rays 1811 and 1812, light emitted from light element 1801B illuminates active area 1851 along direction 1810B, and light emitted from light element 1801C illuminates active area 1851 along direction 1810C. Furthermore, according to one embodiment of the invention, directions 1810A, 1810B, and 1810C are different from one another as shown in FIG. 19.

According to one embodiment of the invention, all light rays that are emitted along a same direction by a two-dimensional array of independently operable light elements converge substantially to a same location in the active area of a corresponding light modulator.

Each of the three exemplary illumination systems shown in FIG. 19 can provide illumination in a same color or different colors. For example, illumination system 1801 can provide illumination in blue by, for example, employing blue emitting light sources, or by incorporating appropriate color filters not explicitly shown in FIG. 19. Similarly, illumination system 1802 can provide illumination in red, and illumination system 1803 can provide illumination in green.

Projection system 1800 further includes a color combiner 1860 for combining and superimposing images formed by the three light modulators. FIG. 19 shows optically transmissive light modulators, such as optically transmissive LCDs. In some applications, the modulators can be reflective, (see, e.g., FIGS. 14 and 20) in which case color combiner 1860 combines and superimposes reflected images formed by the light modulators.

Paths of images formed by the different light modulators are schematically shown in color combiner 1860. In particular, ray path 1861 shows the general propagation path for an image formed by illumination system 1801, ray path 1862 shows the general propagation path for an image formed by illumination system 1802, and ray path 1863 shows the general propagation path for an image formed by illumination system 1803. Although the ray paths are shown to be slightly offset relative to one another, this is done for ease of illustration. In general, images formed by the illumination systems substantially overlap and superimpose to form a colored image having high resolution.

Projection system 1800 further includes a projection lens system 1870 and a projection screen 1880. Projection lens system 1870 typically includes multiple lenses (for example, five in FIG. 19). Examples of known projection lens systems are discussed in U.S. Pat. Nos. 6,417,971; 6,301,057; and 5,969,876.

Projection system 1800 may be a rear projection system, in which case projection screen 1880 is preferably a rear projection screen. Projection system 1800 may be a front projection system, in which case projection screen 1880 is preferably a front projection screen.

Figure 20:
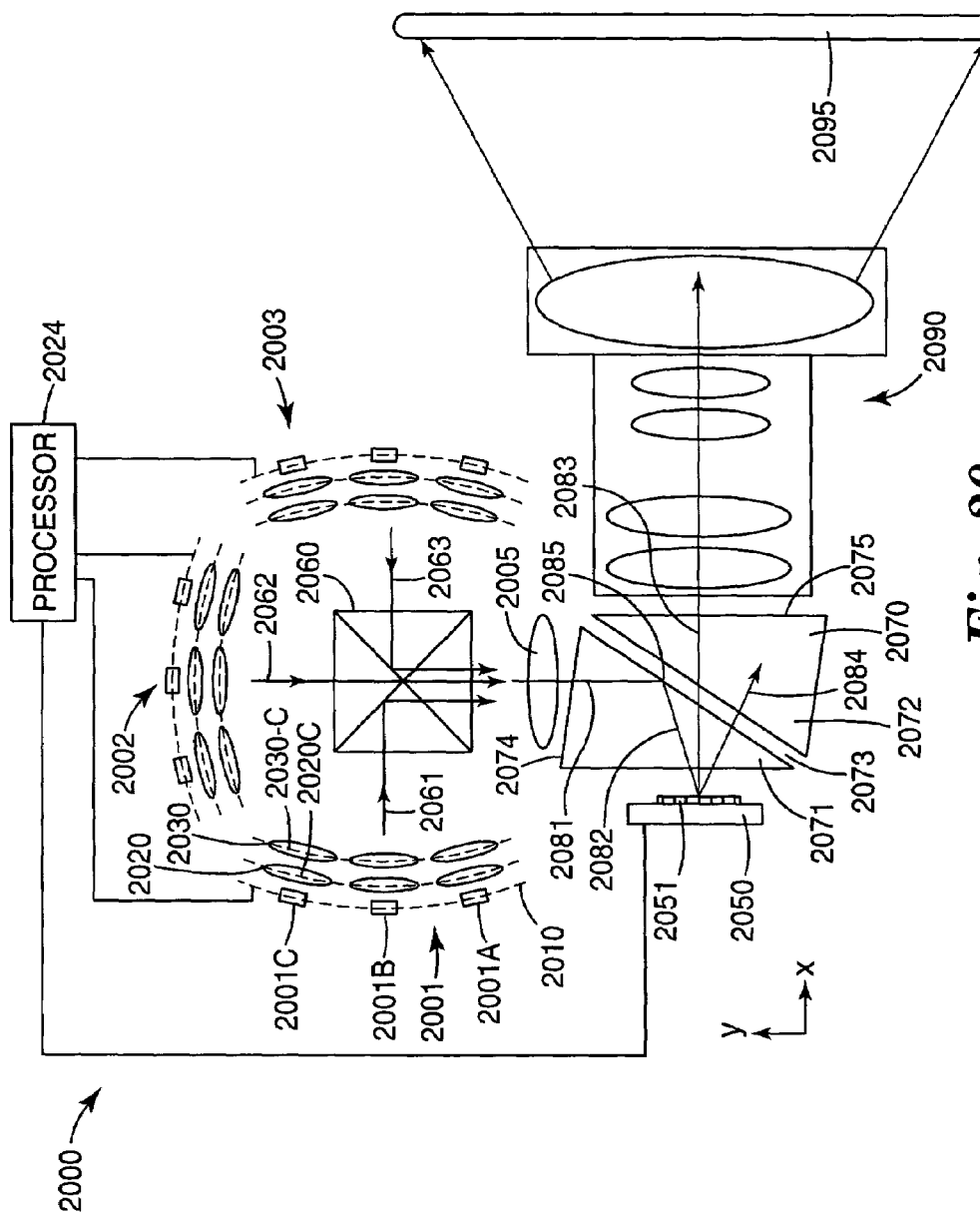
FIG. 20 shows a schematic side-view of a projection system in accordance with another embodiment of the invention.

FIG. 20 shows a schematic side-view of a projection system 2000 in accordance with one embodiment of the invention. Projection system 2000 includes a first illumination system 2001, a second illumination system 2002, and a third illumination system 2003, although, in general, projection system 2000 can have more or fewer illumination systems. Furthermore, although FIG. 20 shows the three illumination systems generally arranged along x and y directions, in general, each illumination system can be oriented in any direction as required in a given application.

Each illumination system in FIG. 20 includes a two-dimensional array of independently operable light elements, a first lens array, and a second lens array. For example, first illumination system 2001 includes two-dimensional array of independently operable light elements 2010, three of which (light elements 2001A, 2001B, and 2001C) are shown in FIG. 20, a first lens array 2020, and a second lens array 2030. In general, the light elements in each two-dimensional array of independently operable light elements are arranged to optimally meet the needs in a given application.

Furthermore, each light element in an illumination system has a dedicated lens from a corresponding first lens array and a dedicated lens from a corresponding second lens array. For example, light element 2001C has dedicated lens 2020C from first lens array 2020 and dedicated lens 2030C from second lens array 2030. The three illumination systems share the same field lens 2005 and the same reflective light modulator 2050, where reflective light modulator 2050 has an active area 2051 capable of displaying an image. Light modulator 2050 is preferably a DMD such as a DLP.

In the exemplary embodiment shown in FIG. 20, the illumination systems share light modulator 2050. In some applications, each illumination system may have a dedicated light modulator.

According to one embodiment of the invention, light emitted by each light element illuminates substantially the entire active area of the light modulator. For example, all light emitted from light element 2001A illuminates substantially the entire active area 2051. Furthermore, according to one embodiment of the invention, light rays from a given light element illuminate active area 2051 along a same direction, where the direction of illumination is different for different light elements in the same two-dimensional array of independently operable light elements.

According to one embodiment of the invention, all light rays that are emitted along a same direction by a two-dimensional array of independently operable light elements converge substantially to a same location in active area 2051 of light modulator 2050.

Each of the three exemplary illumination systems shown in FIG. 20 can provide illumination in a same color or different colors. For example, illumination system 2001 can provide illumination in blue by, for example, employing blue emitting light sources, or by incorporating appropriate color filters not explicitly shown in FIG. 20, illumination system 2002 can provide illumination in red, and illumination system 2003 can provide illumination in green.

Projection system 2000 further includes a color combiner 2060 shared by the three illumination systems for compact and efficient redirecting of light from different light elements to light modulator 2050. Ray paths in color combiner 2060 are schematically shown in FIG. 20. In particular, path 2061 shows the general propagation path for light rays from illumination system 2001, path 2062 shows the general propagation path for light rays from illumination system 2002, and path 2063 shows the general propagation path for light rays from illumination system 2003. Although the ray paths are shown to be slightly offset relative to one another, this is done for ease of illustration. In general, light rays from the illumination systems are sufficiently overlapped to provide efficient illumination of active area 2051.

Projection system 2000 further includes a total internal reflection (TIR) prism 2070 for compact and effective redirecting of light. TIR prism 2070 includes a first prism 2071, a second prism 2072, an input face 2074, an exit face 2075, and a low index area 2073, such as air, for separating prism 2071 from prism 2072.

A ray of light 2081 entering first prism 2071 from input face 2074 suffers total internal reflection at the interface between first prism 2071 and low index area 2073 at point 2085, and propagates toward light modulator 2050 as light ray 2082. Light ray 2082 is incident on a pixel in active area 2051. If the pixel is in an "on" state, incident light ray 2082 is reflected back as ray 2083 that exits TIR prism 2070 from exit face 2075 and propagates towards projection lens system 2090. If, on the other hand, the pixel is in an "off" state, incident light ray 2082 is reflected as ray 2084 away from projection lens system 2090. Ray 2084 is typically trapped by a light trap not shown in FIG. 20.

Projection system 2000 further includes a projection lens system 2090 and a projection screen 2095. Projection lens system 2090 typically includes multiple lenses (for example, five in FIG. 20). Examples of known projection lens systems are discussed in U.S. Pat. Nos. 6,417,971; 6,301,057; and 5,969,876.

Projection system 2000 may be a rear projection system, in which case, projection screen 2095 is preferably a rear projection screen. Projection system 2000 may be a front projection system, in which case, projection screen 2095 is preferably a front projection screen.

Projection system 2000 further includes a processor 2024, similar to processor 1103 of FIG. 16, for determining, ranking, and storing contrast ratios corresponding to each individual light element. Processor 2024 further determines an average intensity of a projectable image formed by light modulator 2050, based on which, processors 2024 may reduce the output intensity of one or more discrete light elements having low contrast ratios and/or increase the output intensity of one or more other discrete light elements having high contrast ratios to improve contrast ratio and/or brightness of the overall projectable image.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. An illumination system for a projection display comprising:
   a plurality of discrete light sources, an output light intensity of each discrete light source being individually controllable;
   an aperture stop positioned in a conjugate plane of the plurality of discrete light sources, the aperture stop having an opening, light from the plurality of discrete light sources filling at least a portion of the opening and forming a first optical field at the aperture stop; and
   a pixelated light modulator having an active area capable of displaying a projectable image, the first optical field illuminating the active area and forming a second optical field at the active area, the first and second optical fields forming a Fourier transform pair, a contrast ratio of the projectable image being adjustable by selectively controlling the output intensity of one or more of the discrete light sources.

2. The illumination system of claim 1, wherein the plurality of discrete light sources form a circular array of discrete light sources.

3. The illumination system of claim 1, wherein at least one of the plurality of discrete light sources is an LED.

4. The illumination system of claim 1, further comprising electronic circuitry for operating each discrete light source individually.

5. The illumination system of claim 1, wherein the opening of the aperture stop is a circle.

6. The illumination system of claim 1, wherein the light from the plurality of discrete light sources substantially fills the entire opening of the aperture stop.

7. The illumination system of claim 1, wherein each of the plurality of discrete light sources is imaged within the opening of the aperture stop.

8. The illumination system of claim 1, wherein the pixelated light modulator comprises a liquid crystal modulator.

9. The illumination system of claim 1, wherein the pixelated light modulator comprises a digital micro-mirror device.

10. The illumination system of claim 1, wherein the contrast of the projectable image is made greater by reducing the output intensity of one or more of the outermost discrete light sources of the plurality of discrete light sources.

11. A projection display comprising one or more of the illumination system of claim 1.

12. The projection display of claim 11 being a front projection display.

13. The projection display of claim 11 being a rear projection display.

14. The projection display of claim 11, wherein an image formed by the projection display is a virtual image.

* * * * *